US011376171B2

(12) United States Patent
Valentino et al.

(10) Patent No.: US 11,376,171 B2
(45) Date of Patent: *Jul. 5, 2022

(54) POWERED ROLL-IN COTS

(71) Applicant: Ferno-Washington, Inc., Wilmington, OH (US)

(72) Inventors: Nicholas V. Valentino, Dayton, OH (US); Matthew Michael Palastro, Grove City, OH (US); Zhen Y. Shen, Cincinnati, OH (US); Timothy R. Wells, Hillsboro, OH (US); Timothy Paul Schroeder, Mason, OH (US); Joshua James Markham, Batavia, OH (US); Robert L. Potak, Strongsville, OH (US)

(73) Assignee: Ferno-Washington, Inc., Wilmington, OH (US)

( * ) Notice: Subject to any disclaimer, the term of this patent is extended or adjusted under 35 U.S.C. 154(b) by 159 days.

This patent is subject to a terminal disclaimer.

(21) Appl. No.: 16/943,433

(22) Filed: Jul. 30, 2020

(65) Prior Publication Data

US 2020/0352803 A1  Nov. 12, 2020

Related U.S. Application Data

(60) Continuation of application No. 16/128,873, filed on Sep. 12, 2018, now Pat. No. 10,736,798, which is a
(Continued)

(51) Int. Cl.
*A61G 1/02* (2006.01)
*A61G 1/013* (2006.01)
(Continued)

(52) U.S. Cl.
CPC .......... *A61G 1/0262* (2013.01); *A61G 1/013* (2013.01); *A61G 1/0212* (2013.01);
(Continued)

(58) Field of Classification Search
CPC .... A61G 1/0262; A61G 1/013; A61G 1/0212; A61G 1/0237; A61G 1/0268;
(Continued)

(56) References Cited

U.S. PATENT DOCUMENTS 2,203,204 A  6/1940  Nicolai
2,204,205 A  6/1940  Bell
(Continued)

FOREIGN PATENT DOCUMENTS

CN  102781392 A  11/2012
DE  29721734 U1  3/1998
(Continued)

OTHER PUBLICATIONS

Timing Belt Idler, Dec. 8, 2016, from Repair Pal (5 pages) http://repairpal.com/timing-belt-idler.
(Continued)

*Primary Examiner* — Yuen Wong
(74) *Attorney, Agent, or Firm* — Dinsmore & Shohl, LLP

(57) ABSTRACT

According to one embodiment, a roll-in cot may include a support frame, a pair of back legs, a pair of front legs, and a cot actuation system. The pair of back legs and the pair of front legs can be slidingly coupled to the support frame. Each of the pair of front legs can include a front wheel and an intermediate load wheel. The intermediate load wheel is offset from the front wheel by a load wheel distance. A front actuator can raise the pair of front legs such that the front wheel and the intermediate load wheel of each of the pair of front legs are aligned along a loading level. The intermediate load wheel of each of the pair of front legs can be offset from the pair of back legs by a loading span. The load wheel distance can be greater than the loading span.

20 Claims, 14 Drawing Sheets

Related U.S. Application Data continuation of application No. 15/335,865, filed on Oct. 27, 2016, now Pat. No. 10,098,796, which is a division of application No. 14/245,107, filed on Apr. 4, 2014, now Pat. No. 9,510,982, which is a continuation-in-part of application No. 13/520,627, filed as application No. PCT/US2011/021069 on Jan. 13, 2011, now Pat. No. 9,233,033.

(60) Provisional application No. 61/294,658, filed on Jan. 13, 2010.

(51) Int. Cl.
*A61G 1/048* (2006.01)
*G05D 3/12* (2006.01)
*A61G 3/08* (2006.01)

(52) U.S. Cl.
CPC ......... *A61G 1/0237* (2013.01); *A61G 1/0268* (2013.01); *A61G 1/048* (2013.01); *G05D 3/12* (2013.01); *A61G 3/0875* (2013.01); *A61G 2200/16* (2013.01); *A61G 2203/32* (2013.01)

(58) Field of Classification Search
CPC .. A61G 1/048; A61G 3/0875; A61G 2200/16; A61G 2203/32; G05D 3/12
See application file for complete search history.

(56) References Cited

U.S. PATENT DOCUMENTS

| | | |
|---|---|---|
| 2,278,749 A | 4/1942 | Todd |
| 2,642,250 A | 6/1953 | Kasnowich |
| 3,397,912 A | 8/1968 | Bush |
| 3,544,163 A | 12/1970 | Krein |
| 3,612,606 A | 10/1971 | Swenson |
| 3,631,546 A | 1/1972 | Eliasson |
| 3,752,527 A | 8/1973 | Ferneau et al. |
| 3,759,565 A | 9/1973 | Ferneau |
| 3,826,528 A | 7/1974 | East |
| 3,888,077 A | 6/1975 | Bachmann |
| 3,951,452 A | 4/1976 | Harder, Jr. |
| 4,037,871 A | 7/1977 | Bourgraf et al. |
| 4,073,538 A | 2/1978 | Hunter |
| 4,155,588 A | 5/1979 | Danziger et al. |
| 4,186,905 A | 2/1980 | Brudy |
| 4,225,183 A | 9/1980 | Hanagan et al. |
| 4,270,798 A | 6/1981 | Harder |
| 4,682,810 A | 7/1987 | Zarka |
| 4,745,647 A | 5/1988 | Goodwin |
| 4,761,841 A | 8/1988 | Larsen |
| 4,767,148 A | 8/1988 | Ferneau et al. |
| 4,829,633 A | 5/1989 | Kassner |
| 4,921,295 A | 5/1990 | Stollenwerk |
| 5,015,024 A | 5/1991 | Bloemer |
| 5,023,968 A | 6/1991 | Diehl et al. |
| 5,039,118 A | 8/1991 | Huang |
| 5,056,805 A | 10/1991 | Wang |
| 5,062,179 A | 11/1991 | Huang |
| 5,069,465 A | 12/1991 | Stryker et al. |
| 5,084,922 A | 2/1992 | Louit |
| 5,088,136 A | 2/1992 | Stryker et al. |
| 5,168,601 A | 12/1992 | Liu |
| 5,265,969 A | 11/1993 | Chuang |
| 5,431,087 A | 7/1995 | Kambara |
| 5,509,159 A | 4/1996 | Du-Bois |
| 5,537,700 A | 7/1996 | Way et al. |
| 5,586,346 A | 12/1996 | Stacy et al. |
| 5,630,428 A | 5/1997 | Wallace |
| 5,720,057 A | 2/1998 | Duncan |
| 5,774,914 A | 7/1998 | Johnson et al. |
| 5,839,136 A | 11/1998 | Vance et al. |
| 5,867,911 A | 2/1999 | Yates et al. |
| 5,971,091 A | 10/1999 | Kamen et al. |
| 5,996,954 A | 12/1999 | Rosen et al. |
| 6,311,952 B2 | 11/2001 | Bainter |
| D454,319 S | 3/2002 | Ito |
| 6,405,393 B2 | 6/2002 | Megown |
| 6,503,018 B2 | 1/2003 | Hou et al. |
| 6,550,801 B1 | 4/2003 | Newhard |
| 6,565,111 B2 | 5/2003 | Ageneau |
| 6,578,922 B2 | 6/2003 | Khedira et al. |
| 6,654,973 B2 | 12/2003 | Van Den Heuvel et al. |
| 6,735,794 B1 | 5/2004 | Way et al. |
| 6,752,462 B1 | 6/2004 | Kain et al. |
| 6,789,292 B2 | 9/2004 | Oshima et al. |
| 6,948,197 B1 | 9/2005 | Chen |
| 6,976,696 B2 | 12/2005 | O'Krangley et al. |
| 7,003,829 B2 | 2/2006 | Choi et al. |
| 7,013,510 B1 | 3/2006 | Johnson |
| 7,273,256 B2 | 9/2007 | Jane Santamaria |
| 7,278,338 B2 | 10/2007 | Chen |
| 7,389,552 B1 | 6/2008 | Reed et al. |
| 7,398,571 B2 | 7/2008 | Souke et al. |
| 7,424,758 B2 | 9/2008 | Broadley et al. |
| 7,426,970 B2 | 9/2008 | Olsen |
| 7,540,047 B2 | 6/2009 | Lambarth |
| 7,568,766 B2 | 8/2009 | Chen et al. |
| 7,617,569 B2 | 11/2009 | Liao |
| 7,621,003 B2 | 11/2009 | Myers et al. |
| D606,910 S | 12/2009 | Malassigne et al. |
| 7,631,373 B2 | 12/2009 | Broadley et al. |
| 7,631,575 B2 | 12/2009 | Gard et al. |
| 7,637,550 B2 | 12/2009 | Menna |
| 7,641,211 B2 | 1/2010 | Ivanchenko |
| 7,685,560 B2 | 3/2010 | Nagatomo et al. |
| 7,694,368 B2 | 4/2010 | Lewis, Jr. |
| 7,841,611 B2 | 11/2010 | Ivanchenko |
| 7,857,393 B2 | 12/2010 | Cebula et al. |
| 7,941,881 B2 | 5/2011 | Hayes et al. |
| 7,996,939 B2 | 8/2011 | Benedict et al. |
| 8,051,513 B2 | 11/2011 | Reed et al. |
| 8,056,950 B2 | 11/2011 | Souke et al. |
| 8,100,307 B2 | 1/2012 | Chinn et al. |
| 8,155,918 B2 | 4/2012 | Reed et al. |
| 8,239,983 B2 | 8/2012 | Chinn |
| 8,240,410 B2 | 8/2012 | Heimbrock et al. |
| 8,439,416 B2 | 5/2013 | Lambarth et al. |
| 8,459,679 B2 | 6/2013 | Jessie, Jr. |
| RE44,884 E | 5/2014 | Lambarth |
| 8,714,612 B2 | 5/2014 | Chinn |
| 8,898,862 B1 | 12/2014 | McGrath |
| 8,901,747 B2 | 12/2014 | Miller et al. |
| D729,132 S | 5/2015 | Valentino et al. |
| D729,702 S | 5/2015 | Valentino |
| 9,021,634 B2 | 5/2015 | Goto et al. |
| D742,794 S | 11/2015 | Valentino et al. |
| 9,233,033 B2 | 1/2016 | Valentino et al. |
| D749,014 S | 2/2016 | Valentino et al. |
| 9,248,062 B2 | 2/2016 | Valentino et al. |
| D751,000 S | 3/2016 | Dietz et al. |
| 9,314,384 B2 | 4/2016 | Watanabe et al. |
| 9,456,938 B2 | 10/2016 | Blickensderfer et al. |
| D770,332 S | 11/2016 | Dietz et al. |
| 9,510,982 B2 | 12/2016 | Valentino et al. |
| 9,789,020 B2 | 10/2017 | Blickensderfer et al. |
| 9,999,555 B2 | 6/2018 | Magill et al. |
| 10,045,894 B2 | 8/2018 | Magill et al. |
| 10,098,796 B2 | 10/2018 | Valentino et al. |
| 10,117,794 B2 | 11/2018 | Bourgraf et al. |
| 10,130,528 B2 | 11/2018 | Valentino et al. |
| 2002/0056162 A1 | 5/2002 | Flynn et al. |
| 2002/0174486 A1 | 11/2002 | Heuvel et al. |
| 2003/0025378 A1 | 2/2003 | Lin |
| 2003/0172459 A1 | 9/2003 | Roussy |
| 2004/0088792 A1 | 5/2004 | O'Krangley et al. |
| 2004/0111798 A1 | 6/2004 | Matunaga et al. |
| 2004/0133981 A1 | 7/2004 | Walkingshaw |
| 2005/0126835 A1 | 6/2005 | Lenkman |
| 2005/0283911 A1 | 12/2005 | Roussy |
| 2006/0017263 A1 | 1/2006 | Chen et al. |
| 2006/0075558 A1 | 4/2006 | Lambarth et al. |
| 2006/0082176 A1 | 4/2006 | Broadley et al. |

(56) References Cited

U.S. PATENT DOCUMENTS

| | | |
|---|---|---|
| 2006/0096029 A1 | 5/2006 | Osborne et al. |
| 2006/0195987 A1 | 9/2006 | Walkingshaw |
| 2006/0225203 A1 | 10/2006 | Hosoya et al. |
| 2006/0265807 A1 | 11/2006 | Choy et al. |
| 2007/0000057 A1 | 1/2007 | Ward |
| 2007/0163045 A1 | 7/2007 | Becker et al. |
| 2007/0165044 A1 | 7/2007 | Wells et al. |
| 2007/0245496 A1 | 10/2007 | Chinn |
| 2008/0028527 A1 | 2/2008 | Lewis |
| 2008/0128571 A1 | 6/2008 | Dostaler et al. |
| 2008/0211248 A1 | 9/2008 | Lambarth |
| 2009/0031498 A1 | 2/2009 | Girard et al. |
| 2009/0165208 A1* | 7/2009 | Reed ............... A61G 1/052 5/611 |
| 2009/0172883 A1 | 7/2009 | Benedict et al. |
| 2009/0222988 A1 | 9/2009 | Reed et al. |
| 2009/0313758 A1 | 12/2009 | Menkedick et al. |
| 2010/0199430 A1 | 8/2010 | Chinn |
| 2010/0306921 A1 | 12/2010 | Kramer |
| 2011/0080016 A1 | 4/2011 | Lambarth et al. |
| 2011/0087416 A1 | 4/2011 | Patmore |
| 2011/0260417 A1 | 10/2011 | Bitzer et al. |
| 2011/0265262 A1 | 11/2011 | Di Lauro et al. |
| 2011/0266821 A1 | 11/2011 | Goto et al. |
| 2011/0277773 A1 | 11/2011 | Sullivan et al. |
| 2012/0275896 A1 | 11/2012 | Magill et al. |
| 2013/0168987 A1 | 7/2013 | Valentino et al. |
| 2014/0059768 A1 | 3/2014 | Lemire et al. |
| 2014/0197654 A1 | 7/2014 | Valentino et al. |
| 2014/0265181 A1 | 9/2014 | Lambarth et al. |
| 2014/0276269 A1 | 9/2014 | Illindala |
| 2015/0001871 A1 | 1/2015 | Watanabe et al. |
| 2015/0061240 A1 | 3/2015 | Segawa et al. |
| 2015/0216747 A1 | 8/2015 | Valentino et al. |
| 2015/0313780 A1 | 11/2015 | Valentino et al. |
| 2016/0000617 A1 | 1/2016 | Magill et al. |
| 2016/0106605 A1 | 4/2016 | Valentino et al. |
| 2016/0128880 A1 | 5/2016 | Blickensderfer et al. |
| 2016/0287454 A1 | 10/2016 | Magill et al. |
| 2016/0304007 A1 | 10/2016 | Bourgraf et al. |
| 2016/0374884 A1 | 12/2016 | Blickensderfer et al. |
| 2017/0172819 A1 | 6/2017 | Bourgraf et al. |
| 2017/0367915 A1 | 12/2017 | Blickensderfer et al. |
| 2018/0028383 A1 | 2/2018 | Stryker et al. |

FOREIGN PATENT DOCUMENTS

| | | |
|---|---|---|
| EP | 1698314 B1 | 4/2010 |
| EP | 2347745 A1 | 7/2011 |
| EP | 2412355 A1 | 2/2012 |
| FR | 2695553 A1 | 3/1994 |
| GB | 2351439 A | 1/2001 |
| JP | 0211955 | 1/1990 |
| JP | 02200262 A | 8/1990 |
| JP | H08-215249 A | 8/1996 |
| JP | 2001197962 A | 7/2001 |
| JP | 2002543927 A | 12/2002 |
| JP | 2006208887 A | 8/2006 |
| JP | 2016198578 A | 12/2016 |
| NL | 8901747 A | 2/1991 |
| WO | 0069386 A2 | 11/2000 |
| WO | 0170161 A1 | 9/2001 |
| WO | 2005049607 A1 | 6/2005 |
| WO | 2007128744 A2 | 11/2007 |
| WO | 2011088169 A1 | 7/2011 |
| WO | 2014015255 A2 | 1/2014 |

OTHER PUBLICATIONS

Tensioner from Wikipedia, Dec. 8, 2016 (4 pages) https://en.wikipedia.org/wiki/Tensioner.

"Timing Belt Tensioner", Automotive Care Wayback Machine—Internet Archive: archived from Dec. 29, 2014 http://web.archive.org/web/20141229221712/http://www.automotivecare.com/y- our-engine-101/belts-and-tensioners/.

USPTO Non Final Rejection dated Nov. 2, 2018 in reference to co-pending U.S. Appl. No. 14/979,748, filed Dec. 28, 2015.

USPTO Non Final Rejection dated Dec. 4, 2018 in reference to co-pending U.S. Appl. No. 15/972,998, filed May 7, 2018.

Japanese Office Action issued for Japanese Patent Application No. 2018-011558 dated Aug. 21, 2019.

Communication pursuant to Article 94(3) EPC dated Sep. 17, 2019, pertaining to European Divisional Patent Application No. 18171339.7, Japanese Office Action dated Dec. 4, 2018, pertaining to Japanese Patent Application No. 2015-560317.

USPTO Non Final Rejection dated Aug. 27, 2021 in reference to co-pending U.S. Appl. No. 16/429,473, filed Jun. 3, 2019.

* cited by examiner

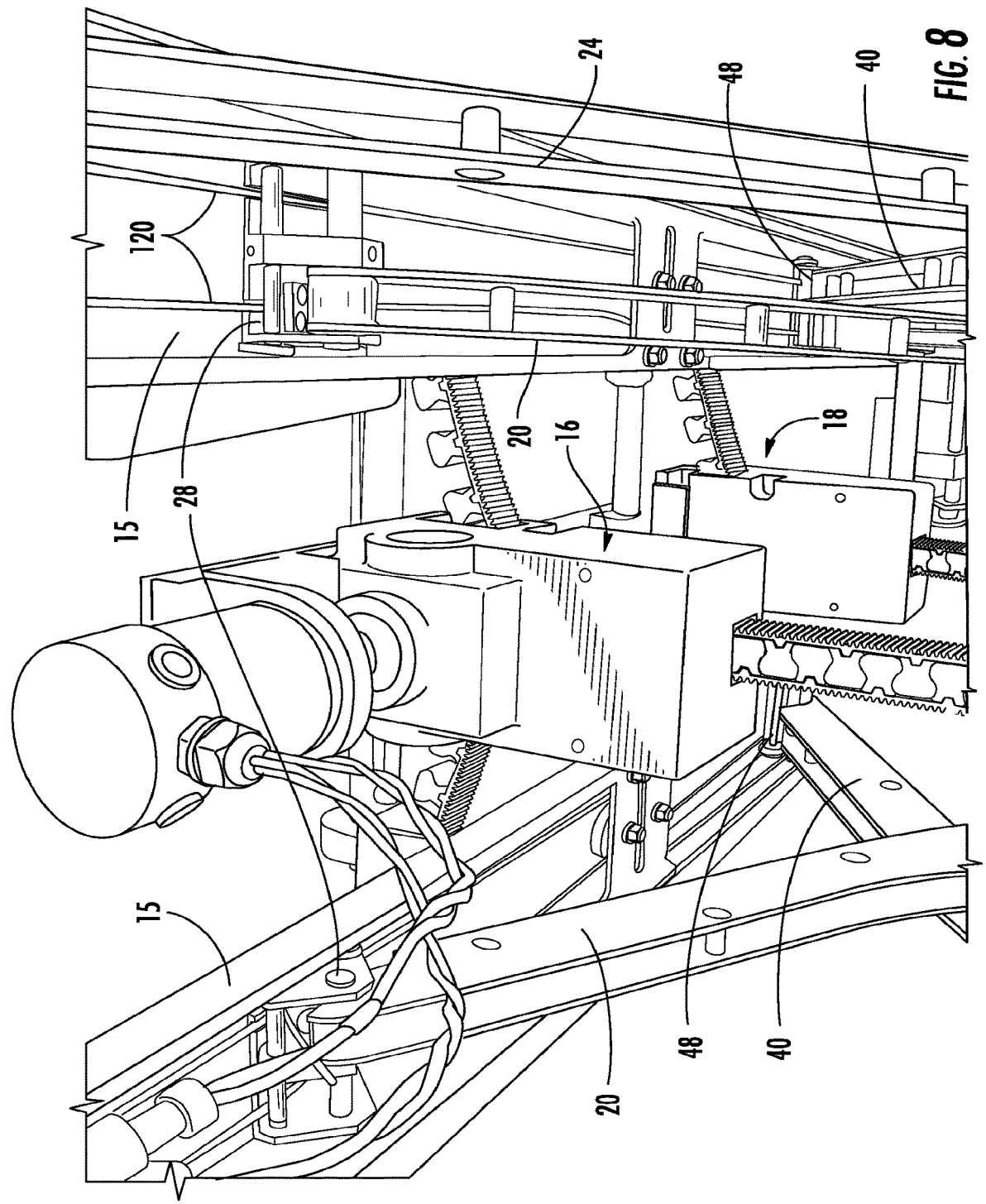

POWERED ROLL-IN COTS

CROSS-REFERENCE TO RELATED APPLICATIONS

This application is a continuation application of U.S. application Ser. No. 16/128,873 filed Sep. 12, 2018, which is a continuation application of U.S. application Ser. No. 15/335,865, filed Oct. 27, 2016, which is a divisional application of U.S. application Ser. No. 14/245,107, filed Apr. 4, 2014, now U.S. Pat. No. 9,510,982, which is a continuation-in-part of U.S. application Ser. No. 13/520,627, filed Dec. 21, 2012, now U.S. Pat. No. 9,233,033, which is a U.S. National Stage of International Application No. PCT/US2011/021069, filed Jan. 13, 2011, which claims the benefit of U.S. Provisional Application No. 61/294,658, filed Jan. 13, 2010.

TECHNICAL FIELD

The present disclosure is generally related to emergency cots, and is specifically directed to powered roll-in cots.

BACKGROUND

There is a variety of emergency cots in use today. Such emergency cots may be designed to transport and load bariatric patients into an ambulance.

For example, the PROFlexX® cot, by Ferno-Washington, Inc. of Wilmington, Ohio U.S.A., is a manually actuated cot that may provide stability and support for loads of about 700 pounds (about 317.5 kg). The PROFlexX® cot includes a patient support portion that is attached to a wheeled undercarriage. The wheeled under carriage includes an X-frame geometry that can be transitioned between nine selectable positions. One recognized advantage of such a cot design is that the X-frame provides minimal flex and a low center of gravity at all of the selectable positions. Another recognized advantage of such a cot design is that the selectable positions may provide better leverage for manually lifting and loading bariatric patients.

Another example of a cot designed for bariatric patients, is the POWERFlexx® Powered Cot, by Ferno-Washington, Inc. The POWERFlexx® Powered Cot includes a battery powered actuator that may provide sufficient power to lift loads of about 700 pounds (about 317.5 kg). One recognized advantage of such a cot design is that the cot may lift a bariatric patient up from a low position to a higher position, i.e., an operator may have reduced situations that require lifting the patient.

A further variety is a multipurpose roll-in emergency cot having a patient support stretcher that is removably attached to a wheeled undercarriage or transporter. The patient support stretcher when removed for separate use from the transporter may be shuttled around horizontally upon an included set of wheels. One recognized advantage of such a cot design is that the stretcher may be separately rolled into an emergency vehicle such as station wagons, vans, modular ambulances, aircrafts, or helicopters, where space and reducing weight is a premium.

Another advantage of such a cot design is that the separated stretcher may be more easily carried over uneven terrain and out of locations where it is impractical to use a complete cot to transfer a patient. Example of such prior art cots can be found in U.S. Pat. Nos. 4,037,871, 4,921,295, and International Publication No. WO01701611.

Although the foregoing multipurpose roll-in emergency cots have been generally adequate for their intended purposes, they have not been satisfactory in all aspects. For example, the foregoing emergency cots are loaded into ambulances according to loading processes that require at least one operator to support the load of the cot for a portion of the respective loading process.

SUMMARY

The embodiments described herein address are directed to a versatile multipurpose roll-in emergency cot which may provide improved management of the cot weight, improved balance, and/or easier loading at any cot height, while being rollable into various types of rescue vehicles, such as ambulances, vans, station wagons, aircrafts and helicopters.

According to one embodiment, In one embodiment, a roll-in cot can include a support frame, a back carriage member, a pair of back legs, a pair of front legs and a cot actuation system. The support frame can include a front end and a back end. The back carriage member can be slidingly engaged with the support frame. The pair of back legs can be rotatably coupled to the back carriage member. Each of the pair of back legs can include a wheel linkage and a back wheel coupled to the wheel linkage. Each of the pair of back legs can define a back leg span that extends from the back carriage member through the wheel linkage. The pair of front legs can be slidingly coupled to the support frame. Each of the pair of front legs can include a front wheel and an intermediate load wheel having an axis of rotation. The intermediate span can be demarcated by the axis of rotation of the intermediate load wheel and the back carriage member. The cot actuation system can include a front actuator that moves the pair of front legs and a back actuator that moves the pair of back legs. The front actuator can retract the pair of front legs such that the intermediate load wheel is supported by a loading surface. The back actuator can retract the pair of back legs such that the back wheel is supported by a lower surface. The lower surface can be lower than the loading surface. A back leg angle $\ominus$ can be formed between the back leg span and the intermediate span. The back leg angle $\ominus$ can be an acute angle.

According to another embodiment, a roll-in cot may include a support frame, a pair of back legs, a pair of front legs, and a cot actuation system. The support frame may include a front end, and a back end. The pair of back legs can be slidingly coupled to the support frame. The pair of front legs can be slidingly coupled to the support frame. Each of the pair of front legs can include a front wheel and an intermediate load wheel. The intermediate load wheel is offset from the front wheel by a load wheel distance. The cot actuation system can include a front actuator that moves the pair of front legs and a back actuator that moves the pair of back legs. The front actuator can raise the pair of front legs such that the front wheel and the intermediate load wheel of each of the pair of front legs are aligned along a loading level. The intermediate load wheel of each of the pair of front legs can be offset, along the loading level, from the pair of back legs by a loading span. The load wheel distance can be greater than the loading span.

According to yet another embodiment, a roll-in cot can include a support frame, a pair of legs slidingly and pivotally engaged with the support frame, and an actuator coupled to the pair of legs. The actuator can be operable to actuate the pair of legs such that the pair of legs slide and rotate with respect to the support frame. A method for actuating the roll-in cot can include receiving from an actuator sensor, automatically with a processor, a load signal indicative of a force acting upon or exerted by the actuator. A control signal indicative of a command to change a height of the roll-in cot can be received. The actuator can be caused to actuate the pair of legs relatively slowly. The actuator can be determined, automatically with the processor, to be unloaded based upon the load signal. The actuator can be caused, automatically with the processor, to actuate the pair of legs at a higher rate. The pair of legs can be actuated at the higher rate after the actuator is determined to be unloaded.

According to a further embodiment, a roll-in cot can include a support frame, a pair of front legs, a pair of back legs, a pair of back hinge members, and a cot actuation system. The support frame can include a front end, and a back end. The pair of front legs can be slidingly coupled to the support frame. The pair of back legs can be slidingly coupled to the support frame. Each of the pair of back legs can include a sinuous internal edge that faces the front end of the support frame. The sinuous internal edge can form an upper angle β. The upper angle β can be an obtuse angle. Each of the pair of back hinge members can be pivotingly coupled to the support frame at a first end and pivotingly coupled to one of the pair of back legs at a second end. The upper angle β of the sinuous internal edge can be located above the second end of one of the pair of back hinge members. The cot actuation system can include a front actuator that moves the pair of front legs and a back actuator that moves the pair of back legs.

According to a further embodiment, a roll-in cot can include a support frame, a pair of front legs, a pair of back legs, and a cot actuation system. The support frame can include a front end, and a back end. The front end can include a pair of front load wheels. The pair of back legs can be slidingly coupled to the support frame. The pair of front legs can be slidingly coupled to the support frame. Each of the front legs can include a front wheel and an intermediate load wheel. The cot actuation system can include a front actuator that moves the pair of front legs and a back actuator that moves the pair of back legs. When the pair of front legs is retracted towards the support frame, the roll-in cot can be configured to be load balanced forward of the intermediate load wheel.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosures can be best understood when read in conjunction with the following drawings, where like structure is indicated with like reference numerals and in which:

FIG. 8 perspective view depicting a cot according to one or more embodiments described herein;

Figure 1:
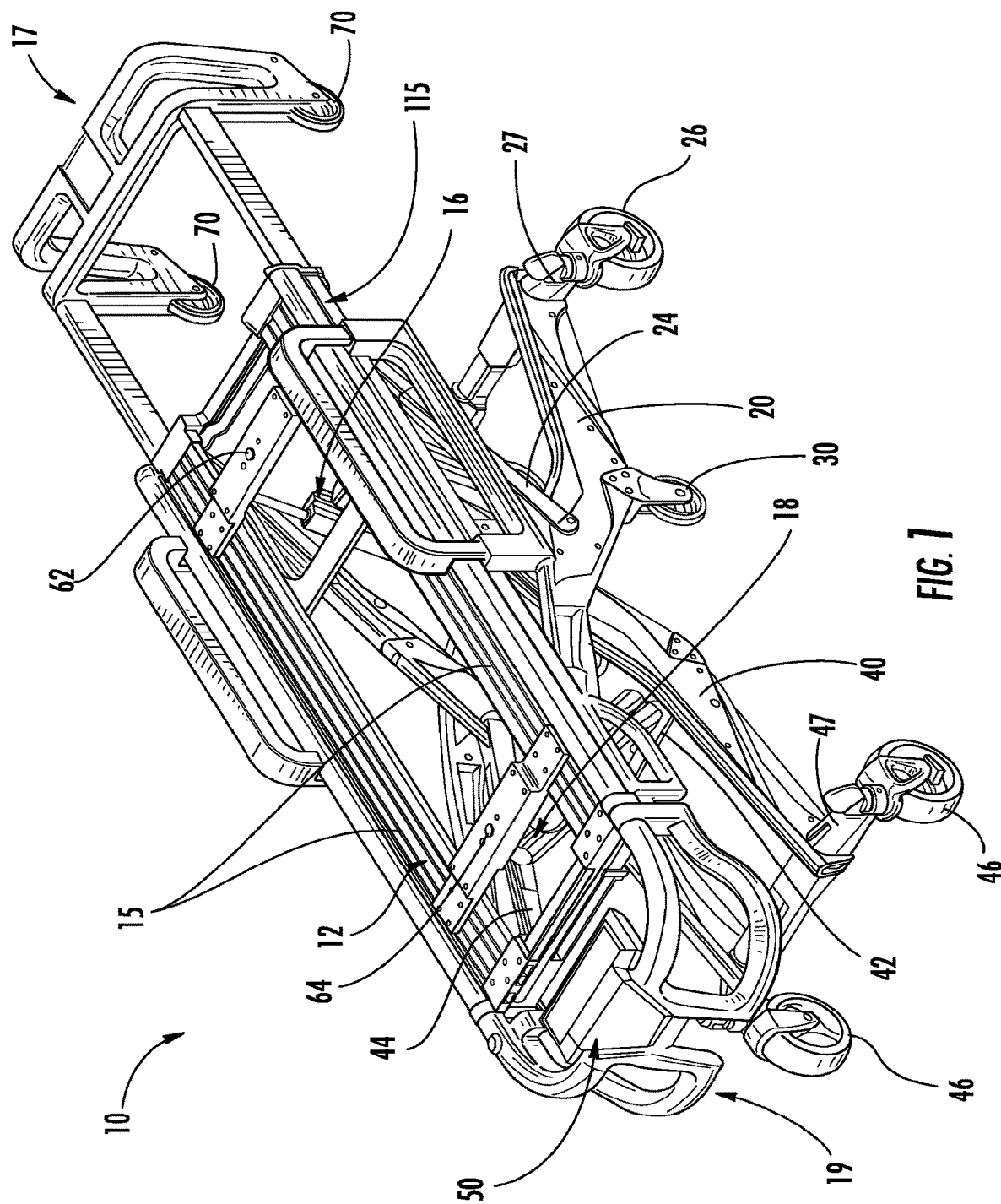
FIG. 1 is a perspective view depicting a cot according to one or more embodiments described herein.

The embodiments set forth in the drawings are illustrative in nature and not intended to be limiting of the embodiments described herein. Moreover, individual features of the drawings and embodiments will be more fully apparent and understood in view of the detailed description.

DETAILED DESCRIPTION

Referring to FIG. 1, a roll-in cot 10 for transport and loading is shown. The roll-in cot 10 comprises a support frame 12 comprising a front end 17, and a back end 19. As used herein, the front end 17 is synonymous with the loading end, i.e., the end of the roll-in cot 10 which is loaded first onto a loading surface. Conversely, as used herein, the back end 19 is the end of the roll-in cot 10 which is loaded last onto a loading surface. Additionally it is noted, that when the roll-in cot 10 is loaded with a patient, the head of the patient may be oriented nearest to the front end 17 and the feet of the patient may be oriented nearest to the back end 19. Thus, the phrase "head end" may be used interchangeably with the phrase "front end," and the phrase "foot end" may be used interchangeably with the phrase "back end." Furthermore, it is noted that the phrases "front end" and "back end" are interchangeable. Thus, while the phrases are used consistently throughout for clarity, the embodiments described herein may be reversed without departing from the scope of the present disclosure. Generally, as used herein, the term "patient" refers to any living thing or formerly living thing such as, for example, a human, an animal, a corpse and the like.

Figure 2:
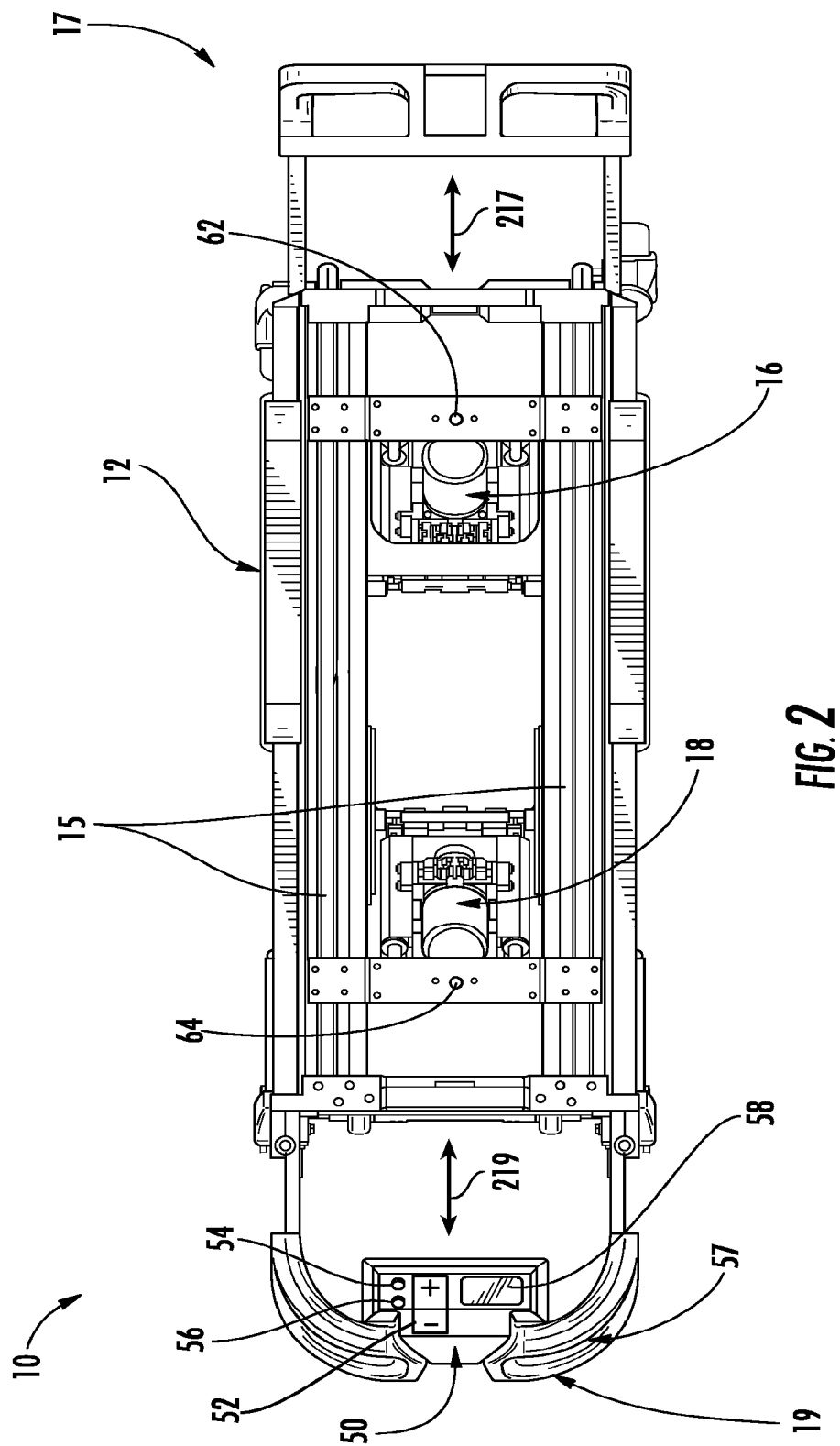
FIG. 2 is a top view depicting a cot according to one or more embodiments described herein.
Figure 3:
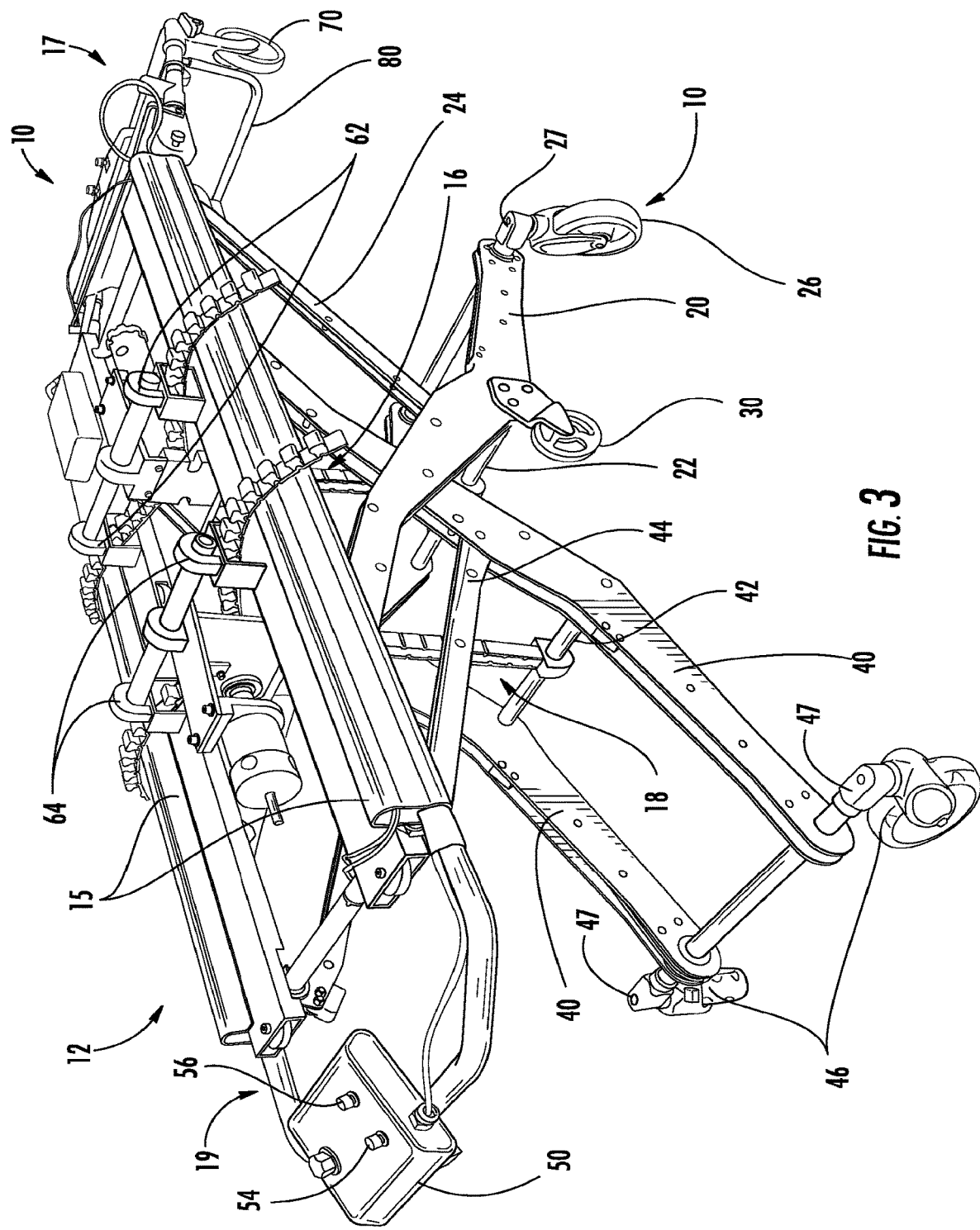
FIG. 3 is a perspective view depicting a cot according to one or more embodiments described herein.

Referring collectively to FIGS. 2 and 3, the front end 17 and/or the back end 19 may be telescoping. In one embodiment, the front end 17 may be extended and/or retracted (generally indicated in FIG. 2 by arrow 217). In another embodiment, the back end 19 may be extended and/or retracted (generally indicated in FIG. 2 by arrow 219). Thus, the total length between the front end 17 and the back end 19 may be increased and/or decreased to accommodate various sized patients. Furthermore, as depicted in FIG. 3, the front end 17 may comprise telescoping lift handles 150. The telescoping lift handles 150 may telescope away from the support frame 12 to provide lifting leverage and telescope towards the support frame 12 to be stored. In some embodiments, the telescoping lift handles 150 are pivotingly coupled to the support frame 12 and are rotatable from a vertical handle orientation to a side handle orientation, and vice versa. The telescoping lift handles 150 may lock in the vertical handle orientation and the side handle orientation. In one embodiment, when the telescoping lift handles 150 are in the side handle orientation, the telescoping lifting handles 150 provide a gripping surface adjacent to the support frame 12 and are each configured to be gripped by a hand with the palm substantially facing up and/or down. Conversely, when the telescoping lift handles 150 are in the vertical handle orientation, the telescoping lifting handles 150 may each be configured to be gripped by a hand with the thumb substantially pointing up and/or down.

Referring collectively to FIGS. 1 and 2, the support frame 12 may comprise a pair of parallel lateral side members 15 extending between the front end 17 and the back end 19. Various structures for the lateral side members 15 are contemplated. In one embodiment, the lateral side members 15 may be a pair of spaced metal tracks. In another embodiment, the lateral side members 15 comprise an undercut portion 115 that is engageable with an accessory clamp (not depicted). Such accessory clamps may be utilized to removably couple patient care accessories such as a pole for an IV drip to the undercut portion 115. The undercut portion 115 may be provided along the entire length of the lateral side members to allow accessories to be removably clamped to many different locations on the roll-in cot 10.

Referring again to FIG. 1, the roll-in cot 10 also comprises a pair of retractable and extendible front legs 20 coupled to the support frame 12, and a pair of retractable and extendible back legs 40 coupled to the support frame 12. The roll-in cot 10 may comprise any rigid material such as, for example, metal structures or composite structures. Specifically, the support frame 12, the front legs 20, the back legs 40, or combinations thereof may comprise a carbon fiber and resin structure. As is described in greater detail herein, the roll-in cot 10 may be raised to multiple heights by extending the front legs 20 and/or the back legs 40, or the roll-in cot 10 may be lowered to multiple heights by retracting the front legs 20 and/or the back legs 40. It is noted that terms such as "raise," "lower," "above," "below," and "height" are used herein to indicate the distance relationship between objects measured along a line parallel to gravity using a reference (e.g. a surface supporting the cot).

In specific embodiments, the front legs 20 and the back legs 40 may each be coupled to the lateral side members 15. Referring to FIG. 8, the front legs 20 may comprise front carriage members 28 slidingly coupled to the tracks of lateral side members 15, and the back legs 40 may also comprise back carriage members 48 slidingly coupled to the tracks of lateral side members 15. Referring to FIGS. 5A-6E and 10, when the roll-in cot 10 is raised or lowered, the carriage members 28 and/or 48 slide inwardly or outwardly, respectively along the tracks of the lateral side members 15.

As shown in FIGS. 5A-6E, the front legs 20 and the back legs 40 may cross each other, when viewing the cot from a side, specifically at respective locations where the front legs 20 and the back legs 40 are coupled to the support frame 12 (e.g., the lateral side members 15 (FIGS. 1-4)). As shown in the embodiment of FIG. 1, the back legs 40 may be disposed inwardly of the front legs 20, i.e., the front legs 20 may be spaced further apart from one another than the back legs 40 are spaced from one another such that the back legs 40 are each located between the front legs 20. Additionally, the front legs 20 and the back legs 40 may comprise front wheels 26 and back wheels 46 which enable the roll-in cot 10 to roll.

In one embodiment, the front wheels 26 and back wheels 46 may be swivel caster wheels or swivel locked wheels. As is described below, as the roll-in cot 10 is raised and/or lowered, the front wheels 26 and back wheels 46 may be synchronized to ensure that the plane of the roll-in cot 10 and the plane of the wheels 26, 46 are substantially parallel. For example, the back wheels 46 may each be coupled to a back wheel linkage 47 and the front wheels 26 may each be coupled to a front wheel linkage 27. As the roll-in cot 10 is raised and/or lowered, the front wheel linkages 27 and the back wheel linkages 47 may be rotated to control the plane of the wheels 26, 46.

A locking mechanism (not depicted) may be disposed in one of the front wheel linkages 27 and the back wheel linkages 47 to allow an operator to selectively enable and/or disable wheel direction locking. In one embodiment, a locking mechanism is coupled to one of the front wheels 26 and/or one of the back wheels 46. The locking mechanism transitions the wheels 26, 46 between a swiveling state and a directionally locked state. For example, in a swiveling state the wheels 26, 46 may be allowed to swivel freely which enables the roll-in cot 10 to be easily rotated. In the directionally locked state, the wheels 26, 46 may be actuated by an actuator (e.g., a solenoid actuator, a remotely operated servomechanism and the like) into a straight orientation, i.e., the front wheels 26 are oriented and locked in a straight direction and the back wheels 46 swivel freely such that an operator pushing from the back end 19 would direct the roll-in cot 10 forward.

Referring again to FIG. 1, the roll-in cot 10 may also comprise a cot actuation system comprising a front actuator 16 configured to move the front legs 20 and a back actuator 18 configured to move the back legs 40. The cot actuation system may comprise one unit (e.g., a centralized motor and pump) configured to control both the front actuator 16 and the back actuator 18. For example, the cot actuation system may comprise one housing with one motor capable to drive the front actuator 16, the back actuator 18, or both utilizing valves, control logic and the like. Alternatively as depicted in FIG. 1, the cot actuation system may comprise separate units configured to control the front actuator 16 and the back actuator 18 individually. In this embodiment, the front actuator 16 and the back actuator 18 may each include separate housings with individual motors to drive the actuators 16 or 18. While the actuators are shown as hydraulic actuators or chain lift actuators in the present embodiments, various other structures are contemplated as being suitable.

Referring to FIG. 1, the front actuator 16 is coupled to the support frame 12 and configured to actuate the front legs 20 and raise and/or lower the front end 17 of the roll-in cot 10. Additionally, the back actuator 18 is coupled to the support frame 12 and configured to actuate the back legs 40 and raise and/or lower the back end 19 of the roll-in cot 10. The cot actuation system may be motorized, hydraulic, or combinations thereof. Furthermore, it is contemplated that the roll-in cot 10 may be powered by any suitable power source. For example, the roll-in cot 10 may comprise a battery capable of supplying a voltage of, such as, about 24 V nominal or about 32 V nominal for its power source.

The front actuator 16 and the back actuator 18 are operable to actuate the front legs 20 and back legs 40, simultaneously or independently. As shown in FIGS. 5A-6E, simultaneous and/or independent actuation allows the roll-in cot 10 to be set to various heights and angles with respect to a surface supporting the roll-in cot 10.

Any actuator suitable to raise and lower the support frame 12 as well as retract the front legs 20 and back legs 40 is contemplated herein. As depicted in FIGS. 3 and 8, the front actuator 16 and/or the back actuator 18 may include chain lift actuators (e.g., chain lift actuators by Serapid, Inc. of Sterling Heights, Mich. U.S.A.). Alternatively, the front actuator 16 and/or the back actuator 18 may also include wheel and axle actuators, hydraulic jack actuators, hydraulic column actuators, telescopic hydraulic actuators electrical motors, pneumatic actuators, hydraulic actuators, linear actuators, screw actuators, and the like. For example, the actuators described herein may be capable of providing a dynamic force of about 350 pounds (about 158.8 kg) and a static force of about 500 pounds (about 226.8 kg). Furthermore, the front actuator 16 and the back actuator 18 may be operated by a centralized motor system or multiple independent motor systems.

In one embodiment, schematically depicted in FIGS. 1-2 and 7A-7B, the front actuator 16 and the back actuator 18 comprise hydraulic actuators for actuating the roll-in cot 10. In the embodiment depicted in FIG. 7A, the front actuator 16 and the back actuator 18 are dual piggy back hydraulic actuators. The dual piggy back hydraulic actuator comprises four hydraulic cylinders with four extending rods that are piggy backed (i.e., mechanically coupled) to one another in pairs. Thus, the dual piggy back actuator comprises a first hydraulic cylinder with a first rod, a second hydraulic cylinder with a second rod, a third hydraulic cylinder with a third rod and a fourth hydraulic cylinder with a fourth rod.

In the depicted embodiment, the dual piggy back hydraulic actuator comprises a rigid support frame 180 that is substantially "H" shaped (i.e., two vertical portions connected by a cross portion). The rigid support frame 180 comprises a cross member 182 that is coupled to two vertical members 184 at about the middle of each of the two vertical members 184. A pump motor 160 and a fluid reservoir 162 are coupled to the cross member 182 and in fluid communication. In one embodiment, the pump motor 160 and the fluid reservoir 162 are disposed on opposite sides of the cross member 182 (e.g., the fluid reservoir 162 disposed above the pump motor 160). Specifically, the pump motor 160 may be a brushed bi-rotational electric motor with a peak output of about 1400 watts. The rigid support frame 180 may include additional cross members or a backing plate to provide further rigidity and resist motion of the vertical members 184 with respect to the cross member 182 during actuation.

Each vertical member 184 comprises a pair of piggy backed hydraulic cylinders (i.e., a first hydraulic cylinder and a second hydraulic cylinder or a third hydraulic cylinder and a fourth hydraulic cylinder) wherein the first cylinder extends a rod in a first direction and the second cylinder extends a rod in a substantially opposite direction. When the cylinders are arranged in one master-slave configuration, one of the vertical members 184 comprises an upper master cylinder 168 and a lower master cylinder 268. The other of the vertical members 184 comprises an upper slave cylinder 169 and a lower slave cylinder 269. It is noted that, while master cylinders 168, 268 are piggy backed together and extend rods 165, 265 in substantially opposite directions, master cylinders 168, 268 may be located in alternate vertical members 184 and/or extend rods 165, 265 in substantially the same direction.

Figure 7A:
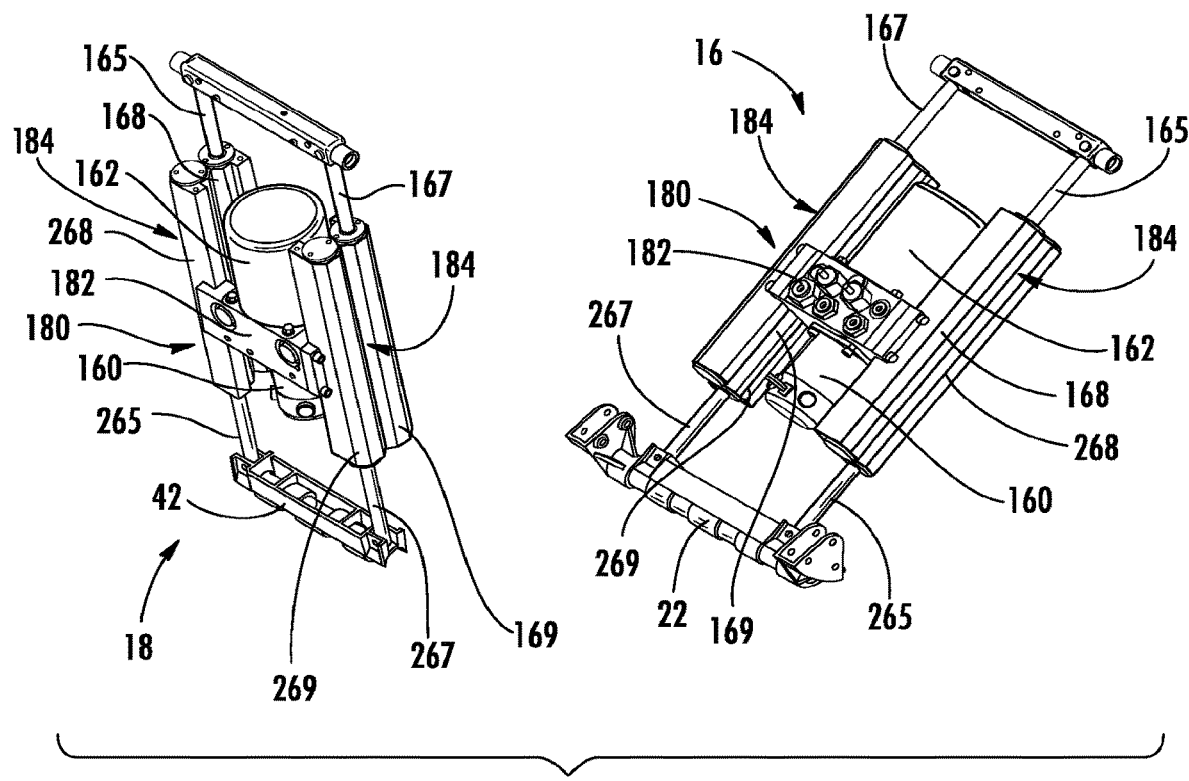
FIG. 7A is a perspective view depicting an actuator according to one or more embodiments described herein.
Figure 7B:
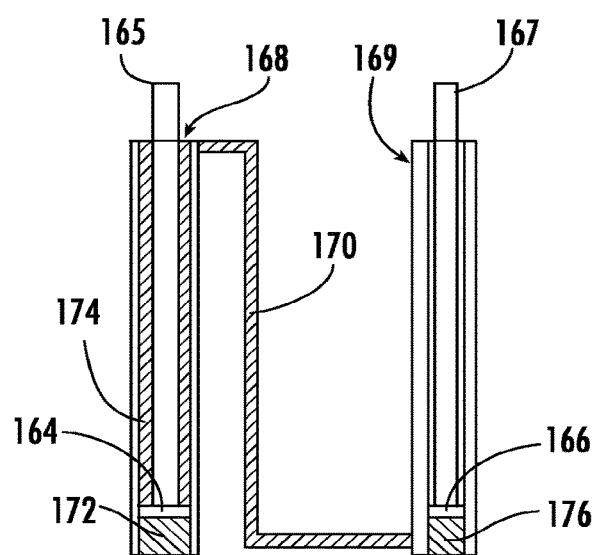
FIG. 7B schematically depicts an actuator according to one or more embodiments described herein.

Referring now to FIG. 7B, a master-slave hydraulic circuit is formed by placing two cylinders in fluidic communication. Specifically, the upper master cylinder 168 is in fluidic communication with the upper slave cylinder 169 and may communicate hydraulic fluid via the fluid connection 170. The pump motor 160 pressurizes hydraulic fluid stored in the fluid reservoir 162. The upper master cylinder 168 receives pressurized hydraulic fluid from the pump motor 160 in a first master volume 172 disposed on one side of the upper master piston 164. As pressurized hydraulic fluid displaces the upper master piston 164, the upper master rod 165, which is coupled to the upper master piston 164, extends out of the upper master cylinder 168 and a secondary hydraulic fluid is displaced from a second master volume 174 disposed on another side of the upper master piston 164. The secondary hydraulic fluid is communicated through the fluid connection 170 and received in a slave volume 176 disposed on one side of upper slave piston 166. Since the volume of secondary hydraulic fluid displaced from the upper master cylinder 168 is substantially equal to the slave volume 176, the upper slave piston 166 and the upper master piston 164 are displaced at substantially the same speed and travel substantially the same distance. Thus, the upper slave rod 167, which is coupled to the upper slave piston 166, and the upper master rod 165 are displaced at substantially the same speed and travel substantially the same distance.

Referring back to FIG. 7A, a similar master-slave hydraulic circuit is formed by placing the lower master cylinder 268 in fluidic communication with the lower slave cylinder 269. Thus, the lower master rod 265 and the lower slave rod 267 are displaced at substantially the same speed and travel substantially the same distance. In another embodiment, a flow divider may be used to regulate the distribution of pressurized hydraulic fluid from pump motor 160 and substantially equally divide the flow between the upper master cylinder 168 and the lower master cylinder 268 to cause all of the rods 165, 167, 265, 267 to move in unison, i.e., the fluid can be divided equally to both master cylinders which causes the upper and lower rods to move at the same time. The direction of the displacement of the rods 165, 167, 265, 267 is controlled by pump motor 160, i.e., the pressure of the hydraulic fluid may be set relatively high to supply fluid to the master cylinders for raising the corresponding legs and set relatively low to pull hydraulic fluid from the master cylinders for lowering the corresponding legs.

While the cot actuation system is typically powered, the cot actuation system may also comprise a manual release component (e.g., a button, tension member, switch, linkage or lever) configured to allow an operator to raise or lower the front and back actuators 16, 18 manually. In one embodiment, the manual release component disconnects the drive units of the front and back actuators 16, 18 to facilitate manual operation. Thus, for example, the wheels 26,46 may remain in contact with the ground when the drive units are disconnected and the roll-in cot 10 is manually raised. The manual release component may be disposed at various positions on the roll-in cot 10, for example, on the back end 19 or on the side of the roll-in cot 10.

To determine whether the roll-in cot 10 is level, sensors (not depicted) may be utilized to measure distance and/or angle. For example, the front actuator 16 and the back actuator 18 may each comprise encoders which determine the length of each actuator. In one embodiment, the encoders are real time encoders which are operable to detect movement of the total length of the actuator or the change in length of the actuator when the cot is powered or unpowered (i.e., manual control). While various encoders are contemplated, the encoder, in one commercial embodiment, may be the optical encoders produced by Midwest Motion Products, Inc. of Watertown, Minn. U.S.A. In other embodiments, the cot comprises angular sensors that measure actual angle or change in angle such as, for example, potentiometer rotary sensors, hall effect rotary sensors and the like. The angular sensors can be operable to detect the angles of any of the pivotally coupled portions of the front legs 20 and/or the back legs 40. In one embodiment, angular sensors are operably coupled to the front legs 20 and the back legs 40 to detect the difference between the angle of the front leg 20 and the angle of the back leg 40 (angle delta). A loading state angle may be set to an angle such as about 20° or any other angle that generally indicates that the roll-in cot 10 is in a loading state (indicative of loading and/or unloading). Thus, when the angle delta exceeds the loading state angle the roll-in cot 10 may detect that it is in a loading state and perform certain actions dependent upon being in the loading state.

It is noted that the term "sensor," as used herein, means a device that measures a physical quantity and converts it into a signal which is correlated to the measured value of the physical quantity. Furthermore, the term "signal" means an electrical, magnetic or optical waveform, such as current, voltage, flux, DC, AC, sinusoidal-wave, triangular-wave, square-wave, and the like, capable of being transmitted from one location to another.

Referring now to FIG. 3, the front legs 20 may further comprise a front cross beam 22 extending horizontally between and moveable with the pair of front legs 20. The front legs 20 also comprise a pair of front hinge members 24 pivotingly coupled to the support frame 12 at one end and pivotingly coupled to the front legs 20 at the opposite end. Similarly, the pair of back legs 40 comprise a back cross beam 42 extending horizontally between and moveable with the pair of back legs 40. The back legs 40 also comprise a pair of back hinge members 44 pivotingly coupled to the support frame at one end and pivotingly coupled to one of the back legs 40 at the opposite end. In specific embodiments, the front hinge members 24 and the back hinge members 44 may be pivotingly coupled to the lateral side members 15 of the support frame 12. As used herein, "pivotingly coupled" means that two objects coupled together to resist linear motion and to facilitate rotation or oscillation between the objects. For example, front and back hinge members 24, 44 do not slide with the front and back carriage members 28, 48, respectively, but they rotate or pivot as the front and back legs 20, 40 are raised, lowered, retracted, or released. As shown in the embodiment of FIG. 3, the front actuator 16 may be coupled to the front cross beam 22, and the back actuator 18 may be coupled to the back cross beam 42.

Figure 4:
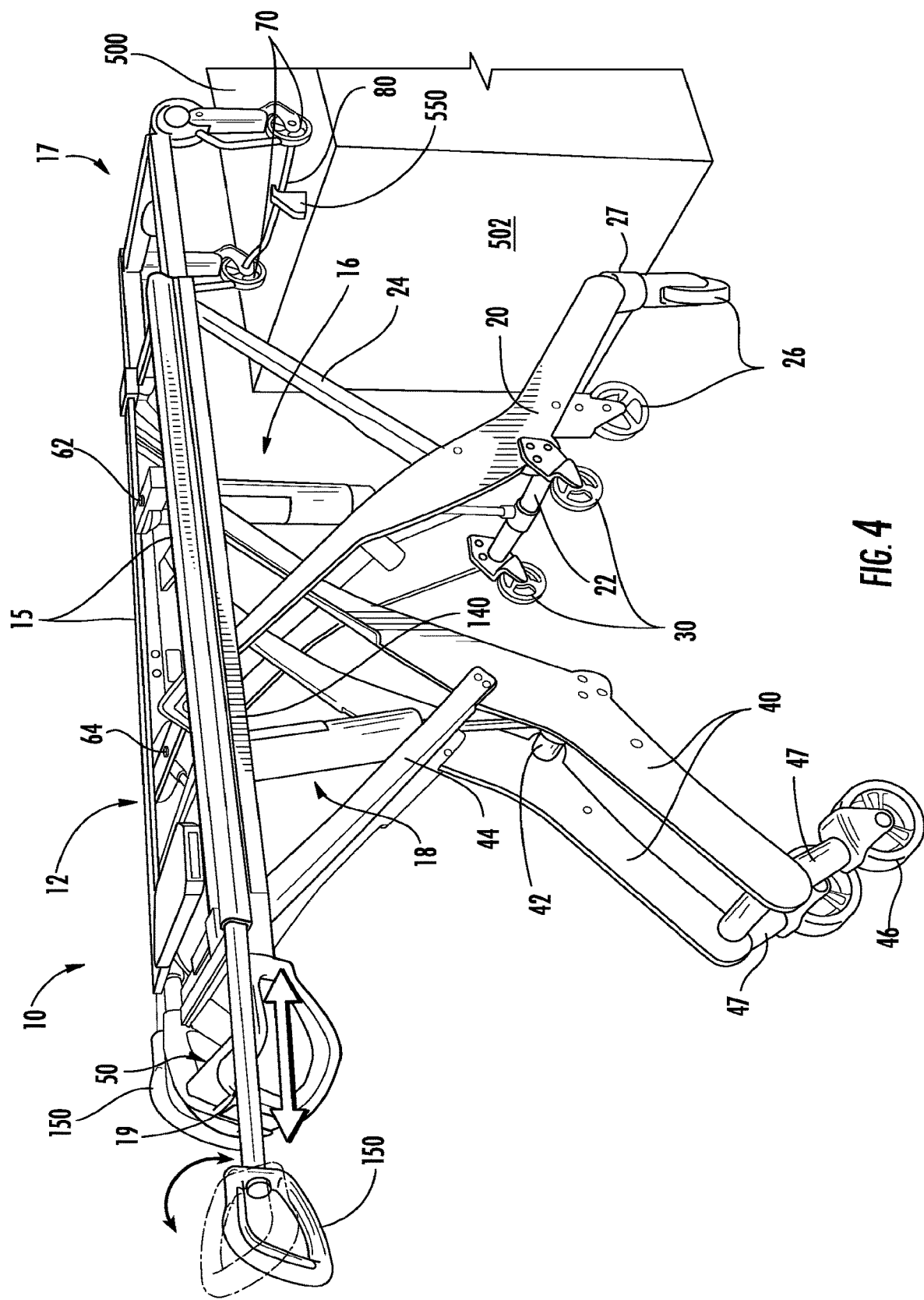
FIG. 4 is a perspective view depicting a cot according to one or more embodiments described herein.

Referring to FIG. 4, the front end 17 may also comprise a pair of front load wheels 70 configured to assist in loading the roll-in cot 10 onto a loading surface 500 (e.g., the floor of an ambulance). The roll-in cot 10 may comprise sensors operable to detect the location of the front load wheels 70 with respect to a loading surface 500 (e.g., distance above the surface or contact with the surface). In one or more embodiments, the front load wheel sensors comprise touch sensors, proximity sensors, or other suitable sensors effective to detect when the front load wheels 70 are above a loading surface 500. In one embodiment, the front load wheel sensors are ultrasonic sensors aligned to detect directly or indirectly the distance from the front load wheels 70 to a surface beneath the load wheels. Specifically, the ultrasonic sensors, described herein, may be operable to provide an indication when a surface is within a definable range of distance from the ultrasonic sensor (e.g., when a surface is greater than a first distance but less than a second distance). Thus, the definable range may be set such that a positive indication is provided by the sensor when a portion of the roll-in cot 10 is in proximity to a loading surface 500.

In a further embodiment, multiple front load wheel sensors may be in series, such that the front load wheel sensors are activated only when both front load wheels 70 are within a definable range of the loading surface 500 (i.e., distance may be set to indicate that the front load wheels 70 are in contact with a surface). As used in this context, "activated" means that the front load wheel sensors send a signal to the control box 50 that the front load wheels 70 are both above the loading surface 500. Ensuring that both front load wheels 70 are on the loading surface 500 may be important, especially in circumstances when the roll-in cot 10 is loaded into an ambulance at an incline.

In the embodiments described herein, the control box 50 comprises or is operably coupled to a processor and a memory. The processor may be an integrated circuit, a microchip, a computer, or any other computing device capable of executing machine readable instructions. The electronic memory may be RAM, ROM, a flash memory, a hard drive, or any device capable of storing machine readable instructions. Additionally, it is noted that distance sensors may be coupled to any portion of the roll-in cot 10 such that the distance between a lower surface and components such as, for example, the front end 17, the back end 19, the front load wheels 70, the front wheels 26, the intermediate load wheels 30, the back wheels 46, the front actuator 16 or the back actuator 18 may be determined.

In further embodiments, the roll-in cot 10 has the capability to communicate with other devices (e.g., an ambulance, a diagnostic system, a cot accessory, or other medical equipment). For example, the control box 50 may comprise or may be operably coupled to a communication member operable to transmit and receive a communication signal. The communication signal may be a signal that complies with Controller Area Network (CAN) protocol, Bluetooth protocol, ZigBee protocol, or any other communication protocol.

The front end 17 may also comprise a hook engagement bar 80, which is typically disposed between the front load wheels 70, and is operable to swivel forward and backward. While the hook engagement bar 80 of FIG. 3 is U-shaped, various other structures such as hooks, straight bars, arc shaped bars, etc. may also be used. As shown in FIG. 4, the hook engagement bar 80 is operable to engage with a loading surface hook 550 on a loading surface 500. Loading surface hooks 550 are commonplace on the floors of ambulances. The engagement of the hook engagement bar 80 and the loading surface hook 550 may prevent the roll-in cot 10 from sliding backwards from the loading surface 500. Moreover, the hook engagement bar 80 may comprise a sensor (not shown) which detects the engagement of the hook engagement bar 80 and the loading surface hook 550. The sensor may be a touch sensor, a proximity sensor, or any other suitable sensor operable to detect the engagement of the loading surface hook 550. In one embodiment, the engagement of the hook engagement bar 80 and the loading surface hook 550 may be configured to activate the front actuator 16 and thereby allow for retraction of the front legs 20 for loading onto the loading surface 500.

Referring still to FIG. 4, the front legs 20 may comprise intermediate load wheels 30 attached to the front legs 20. In one embodiment, the intermediate load wheels 30 may be disposed on the front legs 20 adjacent the front cross beam 22. Like the front load wheels 70, the intermediate load wheels 30 may comprise a sensor (not shown) which are operable to measure the distance the intermediate load wheels 30 are from a loading surface 500. The sensor may be a touch sensor, a proximity sensor, or any other suitable sensor operable to detect when the intermediate load wheels 30 are above a loading surface 500. As is explained in greater detail herein, the load wheel sensor may detect that the wheels are over the floor of the vehicle, thereby allowing the back legs 40 to safely retract. In some additional embodiments, the intermediate load wheel sensors may be in series, like the front load wheel sensors, such that both intermediate load wheels 30 must be above the loading surface 500 before the sensors indicate that the load wheels are above the loading surface 500 i.e., send a signal to the control box 50. In one embodiment, when the intermediate load wheels 30 are within a set distance of the loading surface the intermediate load wheel sensor may provide a signal which causes the control box 50 to activate the back actuator 18. Although the figures depict the intermediate load wheels 30 only on the front legs 20, it is further contemplated that intermediate load wheels 30 may also be disposed on the back legs 40 or any other position on the roll-in cot 10 such that the intermediate load wheels 30 cooperate with the front load wheels 70 to facilitate loading and/or unloading (e.g., the support frame 12).

Figure 11:
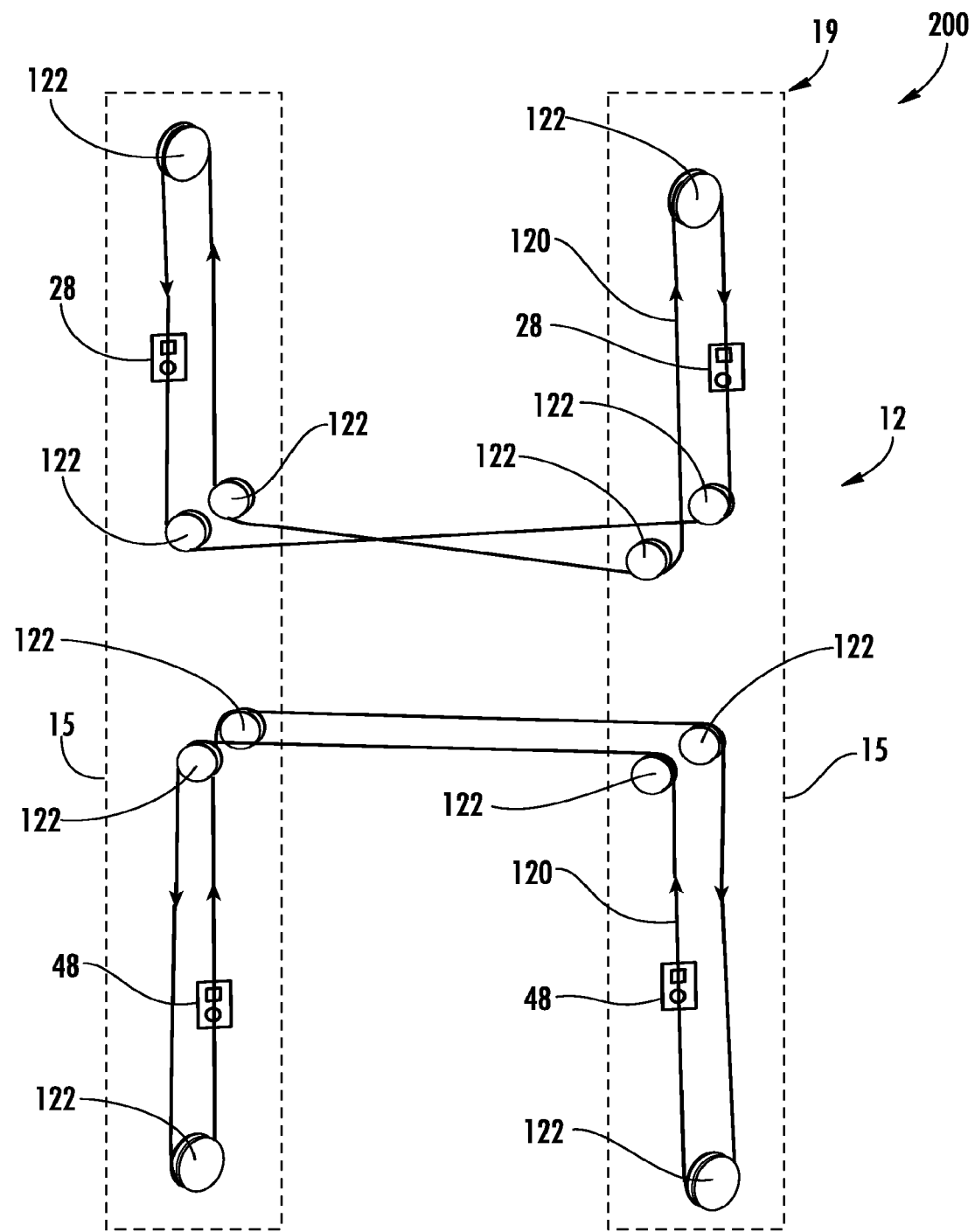
FIG. 11 schematically depicts a tension member and pulley system according to one or more embodiments described herein.

Additionally as shown in FIGS. 8 and 11, the roll-in cot 10 can comprise a tension member and pulley system 200 comprising carriage tension members 120 coupled to the front carriage members 28 and the back carriage members 48. A carriage tension member 120 forms a loop that links each of the front carriage members 28 to one another. The carriage tension member 120 is slidingly engaged with pulleys 122 and extends through the front carriage members 28. Similarly, a carriage tension member 120 forms a loop that links each of the back carriage members 48 to one another. The carriage tension member 120 is slidingly engaged with pulleys 122 and extends through the back carriage members 48. The carriage tension members 120 ensure the front carriage members 28 and the back carriage members 48 move (generally denoted by arrows in FIG. 11) in unison, i.e., the front legs 20 move in unison and the back legs 40 move in unison.

By coupling carriage tension members 120 both of the front carriage members 28 and both of the back carriage members 48, the pulley system ensures parallel movement of the front legs 20 or back legs 40, reduces side to side rocking of the support frame 12, and reduces bending within the lateral side members 15. The pulley system may have the additional benefit of providing a timing system which ensures that movements of opposite sides of the roll-in cot 10 are synchronized (e.g., each of the front legs 20, each of the back legs 40, and/or other components). The timing system may be achieved by arranging carriage tension members 120 and pulleys 122 in the embodiment depicted in FIG. 11, wherein the carriage tension member 120 is crossed to ensure that one front leg 20 cannot move separately from the other front leg 20. As used herein, the phrase "tension member" means a substantially flexible elongate structure capable of conveying force through tension such as, for example, a cable, a cord, a belt, a linkage, a chain, and the like.

Figure 9:
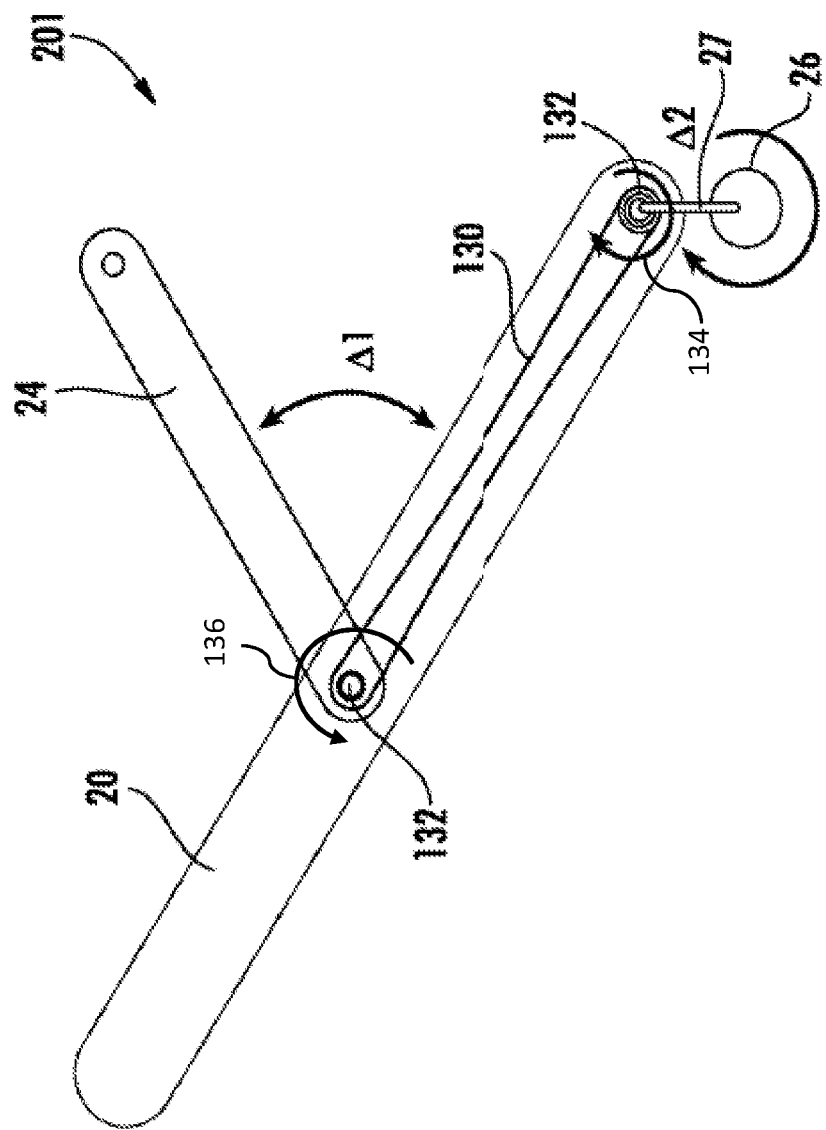
FIG. 9 schematically depicts a timing belt and gear system according to one or more embodiments described herein.
Figure 10:
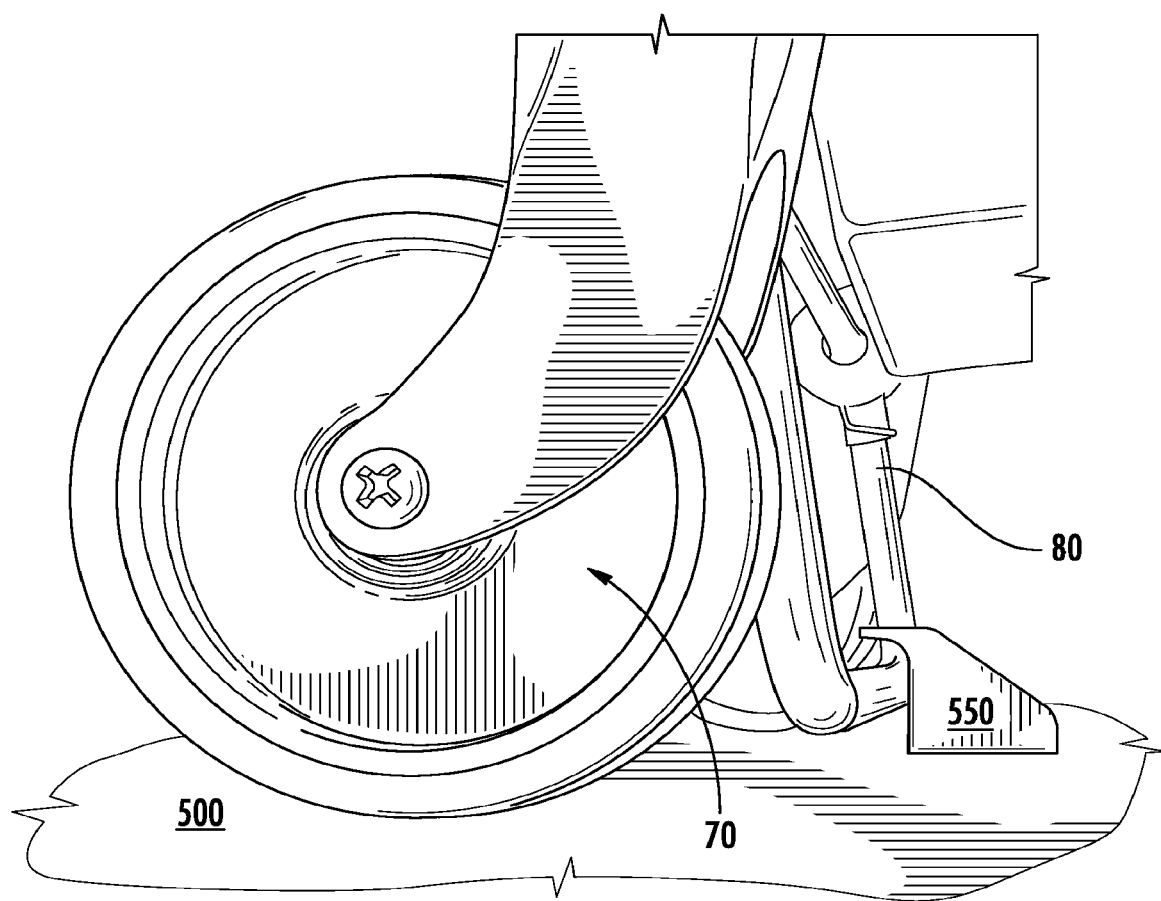
FIG. 10 is a perspective view depicting a hook engagement bar according to one or more embodiments described herein.

Referring now to FIG. 9, in some embodiments the roll-in cot 10 can comprise a timing belt and gear system 201. The gear system 201 comprises a timing belt 130 that is disposed within at least a portion of a front leg 20. The timing belt 130 is engaged with gears 132 that are pivotingly coupled to the front leg 20. One of the gears 132 is coupled to the front hinge member 24 and one of the gears is coupled to the front wheel linkage 27 such that the front linkage can rotate around an axis of rotation 134. The front hinge member 24, which pivots around an axis of rotation 136 as the front leg 20 is actuated, causes the gear 132 to pivot with respect to the front leg 20. As the gear 132 coupled to the front hinge member 24 rotates, the timing belt 130 communicates the rotation to the gear 132 coupled to the front wheel linkage 27. In the embodiment depicted in FIG. 9, the gear 132 coupled to the front hinge member 24 is half the diameter of the gear 132 coupled to the front wheel linkage. Thus, a rotation $\Delta 1$ of the front hinge member 24 will cause a rotation $\Delta 2$ of the front wheel linkage 27 of half the magnitude of the rotation $\Delta 1$ of the front hinge member 24. Specifically, when the front hinge member 24 rotates 10°, the front wheel linkage 27 will only rotate 5°, due to the diameter disparity. In addition to a timing belt and gear system 201 as described herein, it is contemplated that other components, e.g., a hydraulic system or rotation sensors, could also be utilized herein. That is, the timing belt and gear system 201 may be replaced with an angle detection sensor and a servomechanism that actuates the front wheel linkage 27. As used herein, the phrase "timing belt" means any tension member configured to frictionally engage a gear or a pulley.

In further embodiments, both of the front legs 20 can comprise a timing belt and gear system 201. In such embodiments, raising or lowering the front end 17 of the support frame 12 by the front legs 20 trigger the rotation of the front wheel linkage 27. Additionally, the back legs 40 may comprise a timing belt and gear system 201, wherein the raising or lowering of the back end 19 of the support frame 12 by the back legs 40 triggers the rotation of the back wheel linkage 47. Specifically, rotation of the back hinge member 44 with respect to the back leg 40 around the axis of rotation 136 can cause the back wheel linkage 47 with respect to the back leg 40 around the axis of rotation 134. Thus in embodiments where each of the front legs 20 and the back legs 40 comprise a timing belt and gear system 201, the front wheels 26 and back wheels 46 can be rotated to ensure that the front wheels 26 and back wheels 46 can roll across surfaces at various cot heights. Thus, the roll-in cot 10 may be rolled side to side at any height when the support frame 12 is substantially parallel to the ground, i.e., the front legs 20 and the back legs 40 are actuated to substantially the same length.

Referring again to FIG. 3, the roll-in cot 10 may comprise a front actuator sensor 62 and a back actuator sensor 64 configured to detect whether a force is applied to or exerted by the front and back actuators 16, 18, respectively. In some embodiments, the front actuator sensor 62 and the back actuator sensor 64 can be configured to detect whether the front and back actuators 16, 18 are under tension or compression. As used herein, the term "tension" means that a pulling force is being detected by the sensor. Such a pulling force is commonly associated with the load being removed from the legs coupled to the actuator, i.e., the leg and or wheels are being suspended from the support frame 12 without making contact with a surface beneath the support frame 12. Furthermore, as used herein the term "compression" means that a pushing force is being detected by the sensor. Such a pushing force is commonly associated with a load being applied to the legs coupled to the actuator, i.e., the leg and or wheels are in contact with a surface beneath the support frame 12 and transfer a compressive strain on the coupled actuator. In one embodiment, the front actuator sensor 62 and the back actuator sensor 64 are coupled to the support frame 12; however, other locations or configurations are contemplated herein. The sensors may be proximity sensors, strain gauges, load cells, hall-effect sensors, or any other suitable sensor operable to detect when the front actuator 16 and/or back actuator 18 are under tension or compression. In further embodiments, the front actuator sensor 62 and the back actuator sensor 64 may be operable to detect the weight of a patient disposed on the roll-in cot 10 (e.g., when strain gauges are utilized).

Referring to FIGS. 1-4, the movement of the roll-in cot 10 may be controlled via the operator controls. Referring again to the embodiment of FIG. 1, the back end 19 may comprise operator controls for the roll-in cot 10. As used herein, the operator controls are the components used by the operator in the loading and unloading of the roll-in cot 10 by controlling the movement of the front legs 20, the back legs 40, and the support frame 12. Referring to FIG. 2, the operator controls may comprise one or more hand controls 57 (for example, buttons on telescoping handles) disposed on the back end 19 of the roll-in cot 10. Moreover, the operator controls may include a control box 50 disposed on the back end 19 of the roll-in cot 10, which is used by the cot to switch from the default independent mode and the synchronized or "sync" mode. The control box 50 may comprise one or more buttons 54, 56 which place in the cot in sync mode, such that both the front legs 20 and back legs 40 can be raised and lowered simultaneously. In a specific embodiment, the sync mode may only be temporary and cot operation will return to the default mode after a period of time, for example, about 30 seconds. In a further embodiment, the sync mode may be utilized in loading and/or unloading the roll-in cot 10. While various positions are contemplated, the control box may be disposed between the handles on the back end 19.

As an alternative to the hand control embodiment, the control box 50 may also include a component which may be used to raise and lower the roll-in cot 10. In one embodiment, the component is a toggle switch 52, which is able to raise (+) or lower (−) the cot. Other buttons, switches, or knobs are also suitable. Due to the integration of the sensors in the roll-in cot 10, as is explained in greater detail herein, the toggle switch 52 may be used to control the front legs 20 or back legs 40 which are operable to be raised, lowered, retracted or released depending on the position of the roll-in cot 10. In one embodiment the toggle switch is analog (i.e., the pressure and/or displacement of the analog switch is proportional to the speed of actuation). The operator controls may comprise a visual display component 58 configured to inform an operator whether the front and back actuators 16, 18 are activated or deactivated, and thereby may be raised, lowered, retracted or released. While the operator controls are disposed at the back end 19 of the roll-in cot 10 in the present embodiments, it is further contemplated that the operator controls be positioned at alternative positions on the support frame 12, for example, on the front end 17 or the sides of the support frame 12. In still further embodiments, the operator controls may be located in a removably attachable wireless remote control that may control the roll-in cot 10 without physical attachment to the roll-in cot 10.

In other embodiments as shown in FIG. 4, the roll-in cot 10 may further comprise a light strip 140 configured to illuminate the roll-in cot 10 in poor lighting or poor visibility environments. The light strip 140 may comprise LED's, light bulbs, phosphorescent materials, or combinations thereof. The light strip 140 may be triggered by a sensor which detects poor lighting or poor visibility environments. Additionally, the cot may also comprise an on/off button or switch for the light strip 140. While the light strip 140 is positioned along the side of the support frame 12 in the embodiment of FIG. 4, it is contemplated that the light strip 140 could be disposed on the front and/or back legs 20, 40, and various other locations on the roll-in cot 10. Furthermore it is noted that the light strip 140 may be utilized as an emergency beacon analogous to ambulance emergency lights. Such an emergency beacon is configured to sequence the warning lights in a manner that draws attention to the emergency beacon and that mitigates hazards such as, for example photosensitive epilepsy, glare and phototaxis.

Turning now to embodiments of the roll-in cot 10 being simultaneously actuated, the cot of FIG. 4 is depicted as extended, thus front actuator sensor 62 and back actuator sensor 64 detect that the front actuator 16 and the back actuator 18 are under compression, i.e., the front legs 20 and the back legs 40 are in contact with a lower surface and are loaded. The front and back actuators 16 and 18 are both active when the front and back actuator sensors 62, 64 detect both the front and back actuators 16, 18, respectively, are under compression and can be raised or lowered by the operator using the operator controls as shown in FIG. 2 (e.g., "−" to lower and "+" to raise).

Figure 5A:
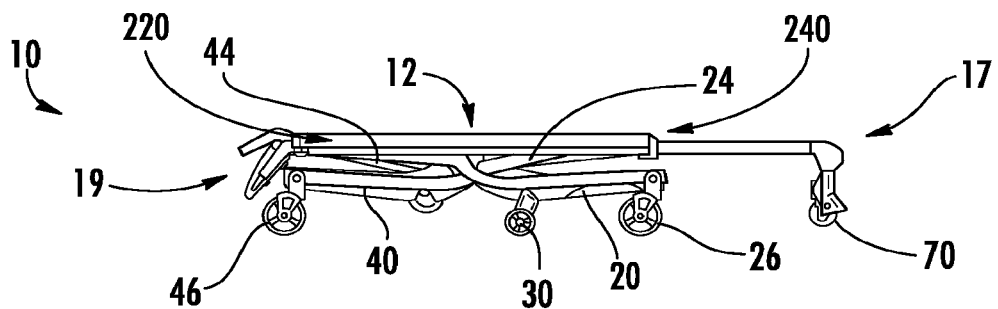
FIGS. 5A-5C is a side view depicting a raising and/or lower sequence of a cot according to one or more embodiments described herein.
Figure 5B:
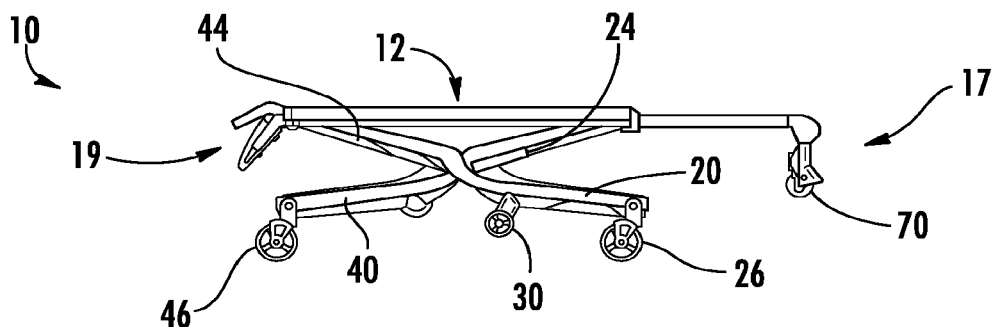
Figure 5C:
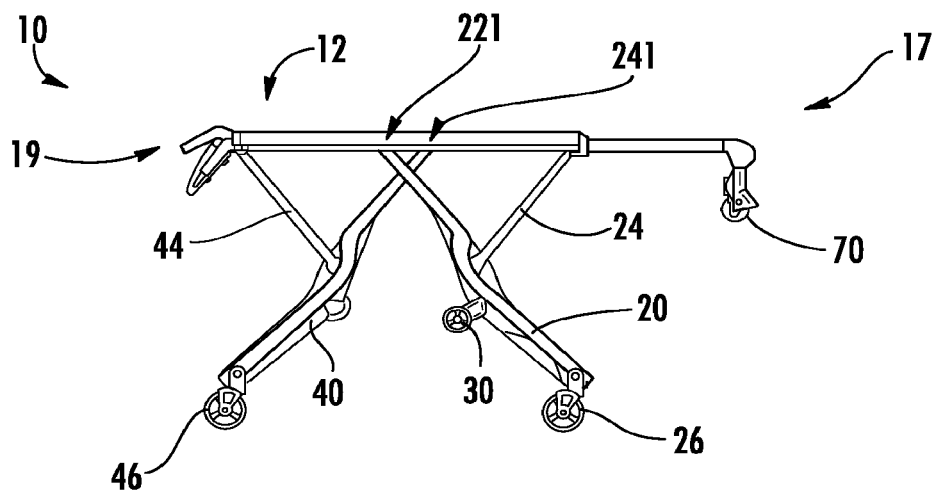

Referring collectively to FIGS. 5A-5C, an embodiment of the roll-in cot 10 being raised (FIGS. 5A-5C) or lowered (FIGS. 5C-5A) via simultaneous actuation is schematically depicted (note that for clarity the front actuator 16 and the back actuator 18 are not depicted in FIGS. 5A-5C). In the depicted embodiment, the roll-in cot 10 comprises a support frame 12 slidingly engaged with a pair of front legs 20 and a pair of back legs 40. Each of the front legs 20 are rotatably coupled to a front hinge member 24 that is rotatably coupled to the support frame 12 (e.g., via carriage members 28, 48 (FIG. 8)). Each of the back legs 40 are rotatably coupled to a back hinge member 44 that is rotatably coupled to the support frame 12. In the depicted embodiment, the front hinge members 24 are rotatably coupled towards the front end 17 of the support frame 12 and the back hinge members 44 that are rotatably coupled to the support frame 12 towards the back end 19.

FIG. 5A depicts the roll-in cot 10 in a lowest transport position (e.g., the back wheels 46 and the front wheels 26 are in contact with a surface, the front leg 20 is slidingly engaged with the support frame 12 such that the front leg 20 contacts a portion of the support frame 12 towards the back end 19 and the back leg 40 is slidingly engaged with the support frame 12 such that the back leg 40 contacts a portion of the support frame 12 towards the front end 17). FIG. 5B depicts the roll-in cot 10 in an intermediate transport position, i.e., the front legs 20 and the back legs 40 are in intermediate transport positions along the support frame 12. FIG. 5C depicts the roll-in cot 10 in a highest transport position, i.e., the front legs 20 and the back legs 40 positioned along the support frame 12 such that the front load wheels 70 are at a maximum desired height which can be set to height sufficient to load the cot, as is described in greater detail herein.

The embodiments described herein may be utilized to lift a patient from a position below a vehicle in preparation for loading a patient into the vehicle (e.g., from the ground to above a loading surface of an ambulance). Specifically, the roll-in cot 10 may be raised from the lowest transport position (FIG. 5A) to an intermediate transport position (FIG. 5B) or the highest transport position (FIG. 5C) by simultaneously actuating the front legs 20 and back legs 40 and causing them to slide along the support frame 12. When being raised, the actuation causes the front legs to slide towards the front end 17 and to rotate about the front hinge members 24, and the back legs 40 to slide towards the back end 19 and to rotate about the back hinge members 44. Specifically, a user may interact with a control box 50 (FIG. 2) and provide input indicative of a desire to raise the roll-in cot 10 (e.g., by pressing "+" on toggle switch 52). The roll-in cot 10 is raised from its current position (e.g., lowest transport position or an intermediate transport position) until it reaches the highest transport position. Upon reaching the highest transport position, the actuation may cease automatically, i.e., to raise the roll-in cot 10 higher additional input is required. Input may be provided to the roll-in cot 10 and/or control box 50 in any manner such as electronically, audibly or manually.

The roll-in cot 10 may be lowered from an intermediate transport position (FIG. 5B) or the highest transport position (FIG. 5C) to the lowest transport position (FIG. 5A) by simultaneously actuating the front legs 20 and back legs 40 and causing them to slide along the support frame 12. Specifically, when being lowered, the actuation causes the front legs to slide towards the back end 19 and to rotate about the front hinge members 24, and the back legs 40 to slide towards the front end 17 and to rotate about the back hinge members 44. For example, a user may provide input indicative of a desire to lower the roll-in cot 10 (e.g., by pressing a "–" on toggle switch 52). Upon receiving the input, the roll-in cot 10 lowers from its current position (e.g., highest transport position or an intermediate transport position) until it reaches the lowest transport position. Once the roll-in cot 10 reaches its lowest height (e.g., the lowest transport position) the actuation may cease automatically. In some embodiments, the control box 50 (FIG. 1) provides a visual indication that the front legs 20 and back legs 40 are active during movement.

In one embodiment, when the roll-in cot 10 is in the highest transport position (FIG. 5C), the front legs 20 are in contact with the support frame 12 at a front-loading index 221 and the back legs 40 are in contact with the support frame 12 a back-loading index 241. While the front-loading index 221 and the back-loading index 241 are depicted in FIG. 5C as being located near the middle of the support frame 12, additional embodiments are contemplated with the front-loading index 221 and the back-loading index 241 located at any position along the support frame 12. For example, the highest transport position may be set by actuating the roll-in cot 10 to the desired height and providing input indicative of a desire to set the highest transport position (e.g., pressing and holding the "+" and "–" on toggle switch 52 simultaneously for 10 seconds).

In another embodiment, any time the roll-in cot 10 is raised over the highest transport position for a set period of time (e.g., 30 seconds), the control box 50 provides an indication that the roll-in cot 10 has exceeded the highest transport position and the roll-in cot 10 needs to be lowered. The indication may be visual, audible, electronic or combinations thereof.

When the roll-in cot 10 is in the lowest transport position (FIG. 5A), the front legs 20 may be in contact with the support frame 12 at a front-flat index 220 located near the back end 19 of the support frame 12 and the back legs 40 may be in contact with the support frame 12 a back-flat index 240 located near the front end 17 of the support frame 12. Furthermore, it is noted that the term "index," as used herein means a position along the support frame 12 that corresponds to a mechanical stop or an electrical stop such as, for example, an obstruction in a channel formed in a lateral side member 15, a locking mechanism, or a stop controlled by a servomechanism.

The front actuator 16 is operable to raise or lower a front end 17 of the support frame 12 independently of the back actuator 18. The back actuator 18 is operable to raise or lower a back end 19 of the support frame 12 independently of the front actuator 16. By raising the front end 17 or back end 19 independently, the roll-in cot 10 is able to maintain the support frame 12 level or substantially level when the roll-in cot 10 is moved over uneven surfaces, for example, a staircase or hill. Specifically, if one of the front legs 20 or the back legs 40 is in tension, the set of legs not in contact with a surface (i.e., the set of legs that is in tension) is activated by the roll-in cot 10 (e.g., moving the roll-in cot 10 off of a curb). Further embodiments of the roll-in cot 10 are operable to be automatically leveled. For example, if back end 19 is lower than the front end 17, pressing the "+" on toggle switch 52 raises the back end 19 to level prior to raising the roll-in cot 10, and pressing the "–" on toggle switch 52 lowers the front end 17 to level prior to lowering the roll-in cot 10.

In one embodiment, depicted in FIG. 2, the roll-in cot 10 receives a first load signal from the front actuator sensor 62 indicative of a first force acting upon the front actuator 16 and a second load signal from the back actuator sensor 64 indicative of a second force acting upon a back actuator 18. The first load signal and second load signal may be processed by logic executed by the control box 50 to determine the response of the roll-in cot 10 to input received by the roll-in cot 10. Specifically, user input may be entered into the control box 50. The user input is received as control signal indicative of a command to change a height of the roll-in cot 10 by the control box 50. Generally, when the first load signal is indicative of tension and the second load signal is indicative of compression, the front actuator actuates the front legs 20 and the back actuator 18 remains substantially static (e.g., is not actuated). Therefore, when only the first load signal indicates a tensile state, the front legs 20 may be raised by pressing the "–" on toggle switch 52 and/or lowered by pressing the "+" on toggle switch 52. Generally, when the second load signal is indicative of tension and the first load signal is indicative of compression, the back actuator 18 actuates the back legs 40 and the front actuator 16 remains substantially static (e.g., is not actuated). Therefore, when only the second load signal indicates a tensile state, the back legs 40 may be raised by pressing the "–" on toggle switch 52 and/or lowered by pressing the "+" on toggle switch 52. In some embodiments, the actuators may actuate relatively slowly upon initial movement (i.e., slow start) to mitigate rapid jostling of the support frame 12 prior to actuating relatively quickly.

Referring collectively to FIGS. 5C-6E, independent actuation may be utilized by the embodiments described herein for loading a patient into a vehicle (note that for clarity the front actuator 16 and the back actuator 18 are not depicted in FIGS. 5C-6E). Specifically, the roll-in cot 10 can be loaded onto a loading surface 500 according the process described below. First, the roll-in cot 10 may be placed into the highest transport position (FIG. 5C) or any position where the front load wheels 70 are located at a height greater than the loading surface 500. When the roll-in cot 10 is loaded onto a loading surface 500, the roll-in cot 10 may be raised via front and back actuators 16 and 18 to ensure the front load wheels 70 are disposed over a loading surface 500. In one embodiment, depicted in FIG. 10, as the roll-in cot 10 continues being loaded, the hook engagement bar 80 may be swiveled over the loading surface hook 550 of a loading surface 500 (e.g., an ambulance platform). Then, the roll-in cot 10 may be lowered until front load wheels 70 contact the loading surface 500 (FIG. 6A).

Figure 6A:
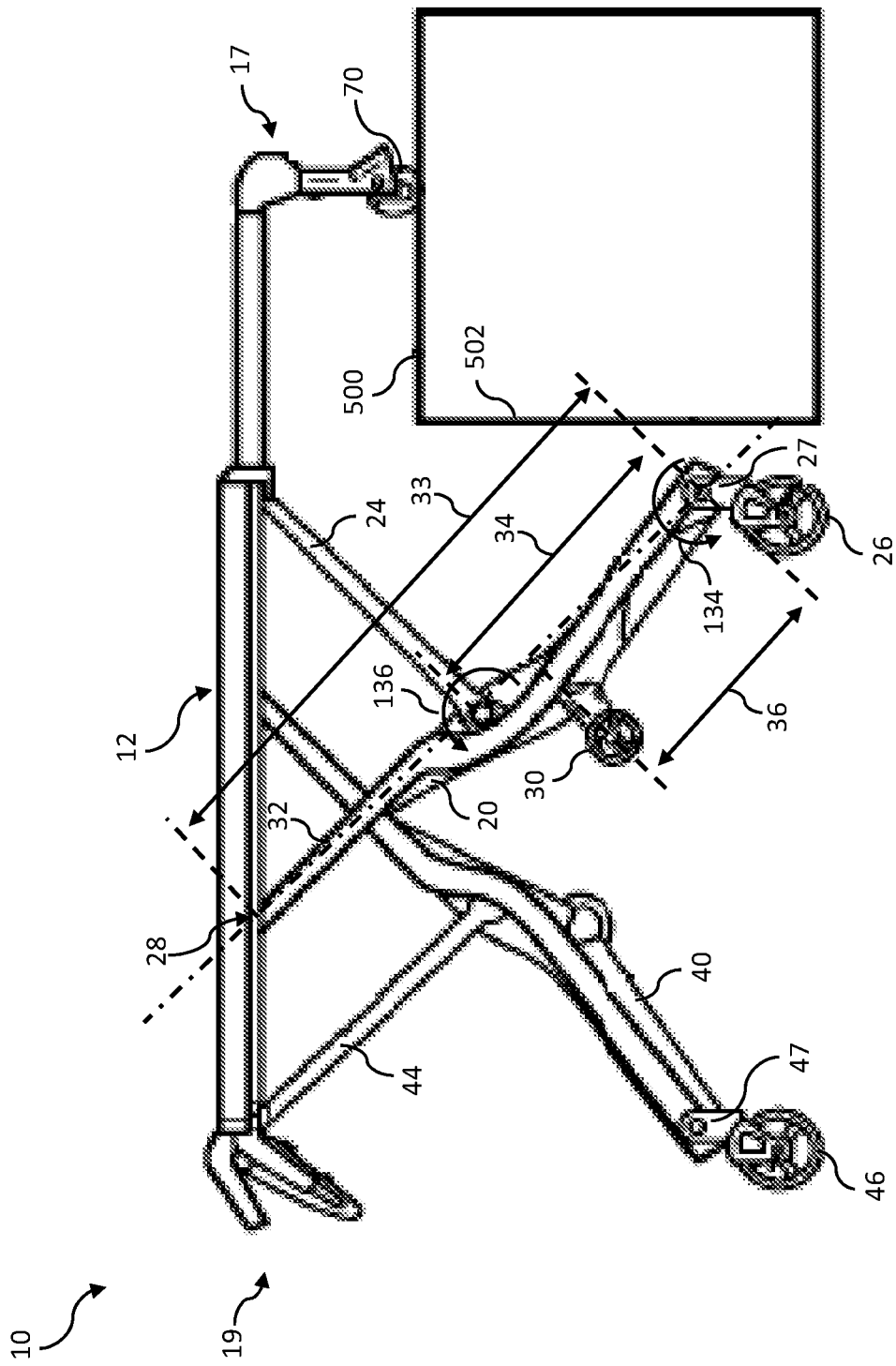
FIGS. 6A-6E is a side view depicting a loading and/or unloading sequence of a cot according to one or more embodiments described herein.

As is depicted in FIG. 6A, the front load wheels 70 are over the loading surface 500. In one embodiment, after the load wheels contact the loading surface 500 the front pair of legs 20 can be actuated with the front actuator 16 because the front end 17 is above the loading surface 500. As depicted in FIGS. 6A and 6B, the middle portion of the roll-in cot 10 is away from the loading surface 500 (i.e., a large enough portion of the roll-in cot 10 has not been loaded beyond the loading edge 502 such that most of the weight of the roll-in cot 10 can be cantilevered and supported by the wheels 70, 26, and/or 30). When the front load wheels are sufficiently loaded, the roll-in cot 10 may be held level with a reduced amount of force.

Additionally, in such a position, the front actuator 16 is in tension and the back actuator 18 is in compression. Thus, for example, if the "−" on toggle switch 52 is activated, the front legs 20 are raised (FIG. 6B). In one embodiment, after the front legs 20 have been raised enough to trigger a loading state, the operation of the front actuator 16 and the back actuator 18 is dependent upon the location of the roll-in cot. In some embodiments, upon the front legs 20 raising, a visual indication is provided on the visual display component 58 of the control box 50 (FIG. 2). The visual indication may be color-coded (e.g., activated legs in green and non-activated legs in red). This front actuator 16 may automatically cease to operate when the front legs 20 have been fully retracted. Furthermore, it is noted that during the retraction of the front legs 20, the front actuator sensor 62 may detect tension, at which point, front actuator 16 may raise the front legs 20 at a higher rate, for example, fully retract within about 2 seconds.

Figure 6D:
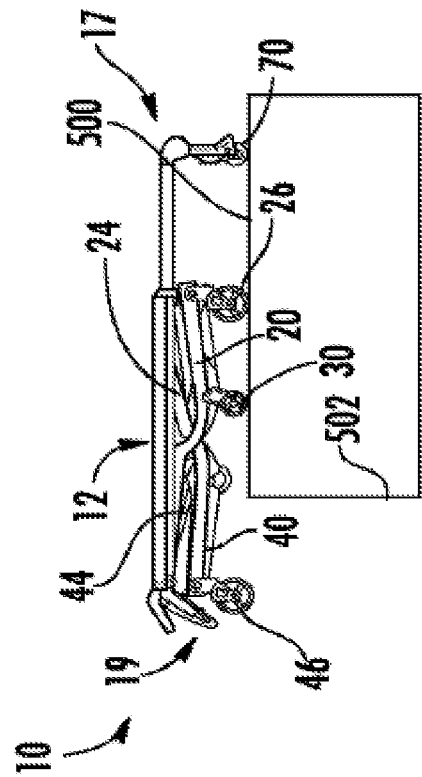
Figure 6E:
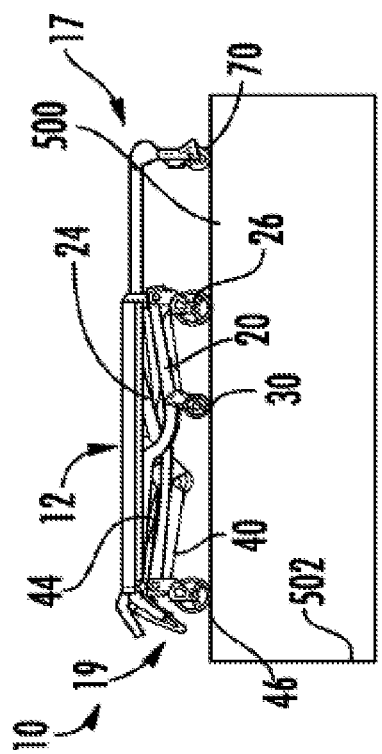
Figure 6B:
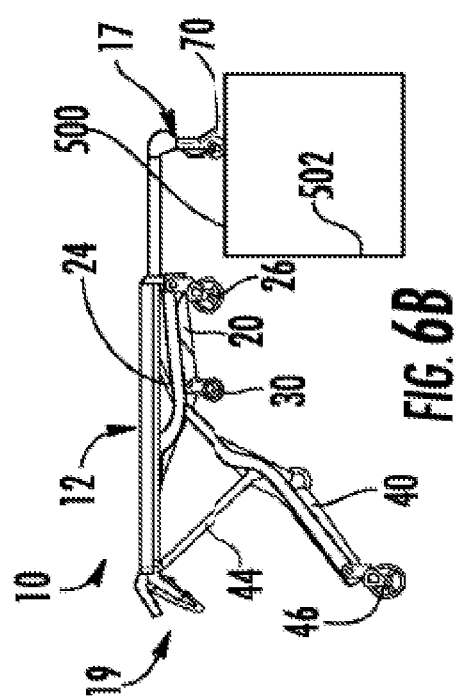
Figure 6C:
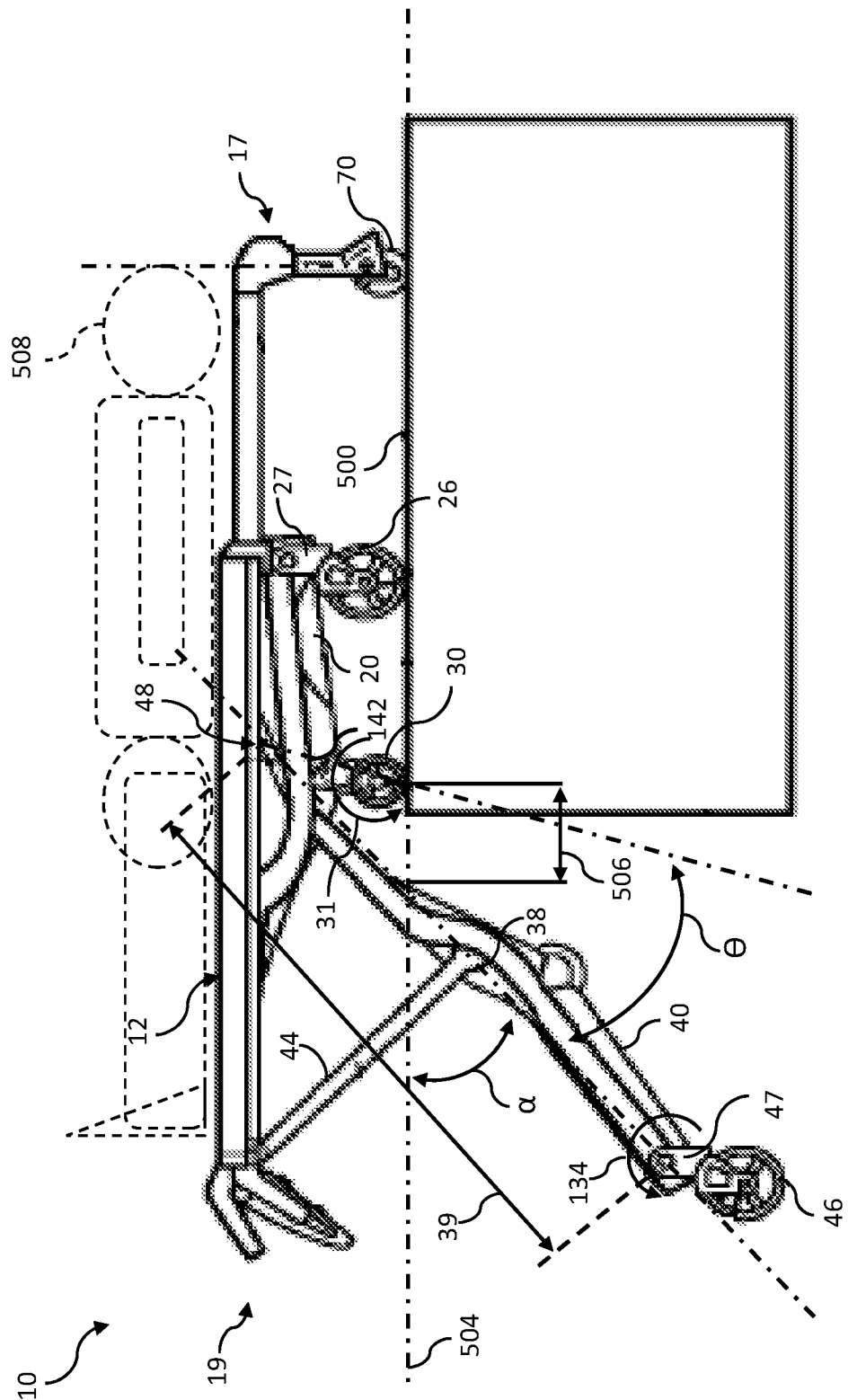

After the front legs 20 have been retracted, the roll-in cot 10 may be urged forward until the intermediate load wheels 30 have been loaded onto the loading surface 500 (FIG. 6C). As depicted in FIG. 6C, the front end 17 and the middle portion of the roll-in cot 10 are above the loading surface 500. As a result, the pair of back legs 40 can be retracted with the back actuator 18. Specifically, an ultrasonic sensor may be positioned to detect when the middle portion is above the loading surface 500. When the middle portion is above the loading surface 500 during a loading state (e.g., the front legs 20 and back legs 40 have an angle delta greater than the loading state angle), the back actuator may be actuated. In one embodiment, an indication may be provided by the control box 50 (FIG. 2) when the intermediate load wheels 30 are sufficiently beyond the loading edge 502 to allow for back leg 40 actuation (e.g., an audible beep may be provided).

It is noted that, the middle portion of the roll-in cot 10 is above the loading surface 500 when any portion of the roll-in cot 10 that may act as a fulcrum is sufficiently beyond the loading edge 502 such that the back legs 40 may be retracted a reduced amount of force is required to lift the back end 19 (e.g., less than half of the weight of the roll-in cot 10, which may be loaded, needs to be supported at the back end 19). Furthermore, it is noted that the detection of the location of the roll-in cot 10 may be accomplished by sensors located on the roll-in cot 10 and/or sensors on or adjacent to the loading surface 500. For example, an ambulance may have sensors that detect the positioning of the roll-in cot 10 with respect to the loading surface 500 and/or loading edge 502 and communications means to transmit the information to the roll-in cot 10.

Referring to FIG. 6D, after the back legs 40 are retracted and the roll-in cot 10 may be urged forward. In one embodiment, during the back leg retraction, the back actuator sensor 64 may detect that the back legs 40 are unloaded, at which point, the back actuator 18 may raise the back legs 40 at higher speed. Upon the back legs 40 being fully retracted, the back actuator 18 may automatically cease to operate. In one embodiment, an indication may be provided by the control box 50 (FIG. 2) when the roll-in cot 10 is sufficiently beyond the loading edge 502 (e.g., fully loaded or loaded such that the back actuator is beyond the loading edge 502).

Once the cot is loaded onto the loading surface (FIG. 6E), the front and back actuators 16, 18 may be deactivated by being lockingly coupled to an ambulance. The ambulance and the roll-in cot 10 may each be fitted with components suitable for coupling, for example, male-female connectors. Additionally, the roll-in cot 10 may comprise a sensor which registers when the roll-in cot 10 is fully disposed in the ambulance, and sends a signal which results in the locking of the actuators 16, 18. In yet another embodiment, the roll-in cot 10 may be connected to a cot fastener, which locks the actuators 16, 18, and is further coupled to the ambulance's power system, which charges the roll-in cot 10. A commercial example of such ambulance charging systems is the Integrated Charging System (ICS) produced by Ferno-Washington, Inc.

Referring collectively to FIGS. 6A-6E, independent actuation, as is described above, may be utilized by the embodiments described herein for unloading the roll-in cot 10 from a loading surface 500. Specifically, the roll-in cot 10 may be unlocked from the fastener and urged towards the loading edge 502 (FIG. 6E to FIG. 6D). As the back wheels 46 are released from the loading surface 500 (FIG. 6D), the back actuator sensor 64 detects that the back legs 40 are unloaded and allows the back legs 40 to be lowered. In some embodiments, the back legs 40 may be prevented from lowering, for example if sensors detect that the cot is not in the correct location (e.g., the back wheels 46 are above the loading surface 500 or the intermediate load wheels 30 are away from the loading edge 502). In one embodiment, an indication may be provided by the control box 50 (FIG. 2) when the back actuator 18 is activated (e.g., the intermediate load wheels 30 are near the loading edge 502 and/or the back actuator sensor 64 detects tension).

When the roll-in cot 10 is properly positioned with respect to the loading edge 502, the back legs 40 can be extended (FIG. 6C). For example, the back legs 40 may be extended by pressing the "+" on toggle switch 52. In one embodiment, upon the back legs 40 lowering, a visual indication is provided on the visual display component 58 of the control box 50 (FIG. 2). For example, a visual indication may be provided when the roll-in cot 10 is in a loading state and the back legs 40 and/or front legs 20 are actuated. Such a visual indication may signal that the roll-in cot should not be moved (e.g., pulled, pushed, or rolled) during the actuation. When the back legs 40 contact the floor (FIG. 6C), the back legs 40 become loaded and the back actuator sensor 64 deactivates the back actuator 18.

When a sensor detects that the front legs 20 are clear of the loading surface 500 (FIG. 6B), the front actuator 16 is activated. In one embodiment, when the intermediate load wheels 30 are at the loading edge 502 an indication may be provided by the control box 50 (FIG. 2). The front legs 20 are extended until the front legs 20 contact the floor (FIG. 6A). For example, the front legs 20 may be extended by pressing the "+" on toggle switch 52. In one embodiment, upon the front legs 20 lowering, a visual indication is provided on the visual display component 58 of the control box 50 (FIG. 2).

Referring back to FIGS. 4 and 10, in embodiments where the hook engagement bar 80 is operable to engage with a loading surface hook 550 on a loading surface 500, the hook engagement bar 80 is disengaged prior to unloading the roll-in cot 10. For example, hook engagement bar 80 may be rotated to avoid the loading surface hook 550. Alternatively, the roll-in cot 10 may be raised from the position depicted in FIG. 4 such that the hook engagement bar 80 avoids the loading surface hook 550.

Referring collectively to FIGS. 6A to 6E, embodiments of the roll-in cot 10 can be configured to facilitate loading and unloading. Specifically, the front legs 20 and the back legs 40 can include geometric features that can reduce the amount of force needed to hold the roll-in cot 10 level. Accordingly, the middle portion of the roll-in cot 10 can operate as a fulcrum that facilitates loading and unloading, i.e., the geometric features of the front legs 20 and the back legs 40 can enhance the balance of the roll-in cot 10 during loading and unloading. For example, the arrangement of the intermediate load wheel 30 along the front leg 20 can enhance the balance of a roll-in cot 10 when supporting a patient during loading and unloading.

Referring now to FIG. 6A, the front leg 20 can define a front leg span 32 that extends along the front leg 20 from the front carriage member 28 through the front wheel linkage 27. A distance 33 of the front leg span 32 can be measured between the carriage member 28 and the axis of rotation 134. The front wheel 26 can be offset from the support frame 12 by the distance 33 of the front leg span 32. A hinge member distance 34 can be defined along the front leg span 32 between the axis of rotation 136 and the axis of rotation 134. Thus, the intersection between the front hinge member 24 and the front leg 20 can be offset from the front wheels by the hinge member distance. Additionally, a load wheel distance 36 can be defined along the front leg span 32 between the axis of rotation 136 and the intermediate load wheel 30. Accordingly, the intermediate load wheel 30 can be offset from the front wheel 26 by the load wheel distance 36. The applicants have discovered that the relationships between the distance 33 of the front leg span 32 and each of the hinge member distance 34 and the load wheel distance 36 can be configured to enhance the balance of the roll-in cot 10 during loading and unloading. In some embodiments, the load wheel distance 36 can be less than about 50% of the distance 33 of the front leg span 32 such as, for example, less than about 45% in one embodiment. In further embodiments, the load wheel distance 36 can be between about 50% and 20% of the distance 33 of the front leg span 32 such as, for example, between about 45% and 35% of the distance 33 of the front leg span 32 in one embodiment, or between about 40% and 30% of the distance 33 of the front leg span 32 in another embodiment. Alternatively or additionally, the hinge member distance 34 can be greater than about 50% of the distance 33 of the front leg span 32 such as, for example, greater than about 60% in one embodiment, or greater than about 70% in another embodiment. In further embodiments, the hinge member distance 34 can be between about 55% and 90% of the distance 33 of the front leg span 32 such as, for example, between about 65% and 85% of the distance 33 of the front leg span 32 in one embodiment, or between about 70% and 80% of the distance 33 of the front leg span 32 in another embodiment. Accordingly, the hinge member distance 34 can be greater than the load wheel distance 36.

Referring now to FIG. 6C, the arrangement of back leg 40 with respect to the front leg 20 can enhance the balance of the roll-in cot 10 during loading and unloading. For example, the arrangement of back leg 40 during loading and unloading from the loading surface 500 can improve the fulcrum effect of the middle portion of the roll-in cot 10. In some embodiments, the back leg 40 can be configured to form a loading angle α with respect to a loading level 504 during loading and unloading. Specifically, the back leg 40 can define a back leg span 38 that extends along the back leg 40 from the back carriage member 48 through the back wheel linkage 47 and that forms the loading angle α with respect to a loading level 504 during loading and unloading. A distance 39 of the back leg span 38 can be measured between the back carriage member 48 and the axis of rotation 134 of the back wheel linkage 47. Accordingly, the back wheel 46 can be offset from the support frame 12 by the distance 39 of the back leg span 38. In some embodiments, the distance 39 of the back leg span 38 can be substantially equal to the distance 33 of the front leg span 32 (FIG. 6A).

As is described in greater detail above, during loading or unloading, the intermediate load wheel 30, the front wheel 26 and the front load wheel 70 can be in contact with the loading surface 500. Accordingly, the outer diameters of the intermediate load wheel 30, the front wheel 26 and the front load wheel 70 can be substantially aligned. The loading level 504 can be defined by the alignment of the outer diameters of the intermediate load wheel 30, the front wheel 26, the front load wheel 70, the loading surface 500, or any combination thereof. The back leg span 38 of the back leg 40 can be configured to form a loading angle α with respect to the loading level 504. In embodiments where the loading level 504 is substantially parallel to the support frame 12 of the roll-in cot 10, the back leg span 38 of the back leg 40 can be configured to form the loading angle α with respect to the support frame 12 of the roll-in cot 10. In some embodiments, the loading angle α can be substantially acute such as, for example, less than about 85° (about 1.48 radians) in one embodiment, between about 75° (about 1.31 radians) and about 40° (about 0.70 radians) in another embodiment, or between about 60° (about 1.05 radians) and about 45° (about 0.79 radians) in a further embodiment.

As is noted above, the arrangement of back leg 40 with respect to the front leg 20 can enhance the balance of the roll-in cot 10 during loading and unloading. For example, when the intermediate load wheel 30, the front wheel 26 and the front load wheel 70 are aligned along the loading level 504, the intermediate load wheel 30 can be offset from the back leg 40 by a loading span 506. The loading span 506 can be measured along the loading level 504 between an axis of rotation 31 of the intermediate load wheel 30 (e.g., a wheel axle) and the back leg 40.

Referring collectively to FIGS. 6A and 6C, the loading span 506 can be less than the load wheel distance 36 such as, for example, the loading span 506 can be less than about 95% of the load wheel distance 36 in one embodiment, or the loading span 506 can be between about 50% and about 95% of the load wheel distance 36 in another embodiment. In further embodiments, the loading span 506 can be between about 4 inches (about 15.2 cm) and about 24 inches (about 61 cm) such as, for example, between about 5 inches (about 25.4 cm) and about 12 inches (about 45.7 cm) in another embodiment.

Referring again to FIG. 6C, the back leg span 38 of the back leg 40 can be configured to form a back leg angle ⊖ with respect to an intermediate span 142 during loading and unloading. The intermediate span 142 can be demarcated by the axis of rotation 31 of the intermediate load wheel 30 (e.g., a wheel axle) and the back carriage member 48. In some embodiments, the back leg angle ⊖ can be configured to enhance the balance of the roll-in cot 10 during loading and unloading. Specifically, when loading or unloading the roll-in cot 10, the back leg 40 can be supported by a surface that is lower than the loading surface 500 and the intermediate load wheel 30 can be supported by the loading surface 500. For example, the back wheel 46 can be supported by the ground or a floor, while the intermediate load wheel 30 is supported by a floor of an ambulance. According to the embodiments described herein, the back leg angle ⊖ can be substantially acute, when the back leg 40 is supported by a surface that is lower than the loading surface 500 and the intermediate load wheel 30 is supported by the loading surface 500 such as, for example, less than about 85° (about 1.48 radians) in one embodiment, between about 60° (about 1.05 radians) and about 80° (about 1.40 radians) in another embodiment.

According to the embodiments described herein, the roll-in cot 10 can be configured to be load balanced towards the front end 17 of the roll-in cot 10. As used herein, the phrase "configured to be load balanced" refers to a center of gravity of a cot-patient combination. As used herein the phrase "cot-patient combination" can mean the resultant combination of the roll-in cot 10 and an anthropomorphic test device 508 such that the top of the head of the anthropomorphic test device 508 is in line with the center of the front load wheel 70. Additionally, it is noted that the phrase "anthropomorphic test device" refers to a 95$^{th}$ Percentile Adult Male Hybrid III Dummy as defined by the National Highway Traffic Safety Administration. The anthropomorphic test device 508 can be supported directly by the support frame 12 or indirectly via patient supporting structure, which is in turn supported by the support frame 12. In some embodiments, the roll-in cot 10 can be configured to be load balanced forward (i.e., towards the front end 17 of the roll-in cot 10) with respect to the intermediate load wheel 30, when the front leg 20 of the roll-in cot 10 is retracted towards the support frame 12. Examples of the front leg 20 being retracted towards the support frame are depicted in FIGS. 5A, and 6B-6E. Thus, in some embodiments, when the back leg 40 is supported by a surface that is lower than the loading surface 500 and the intermediate load wheel 30 is supported by the loading surface 500, the cot-patient combination can have a center of gravity that is forward of the intermediate load wheel 30.

Figure 12:
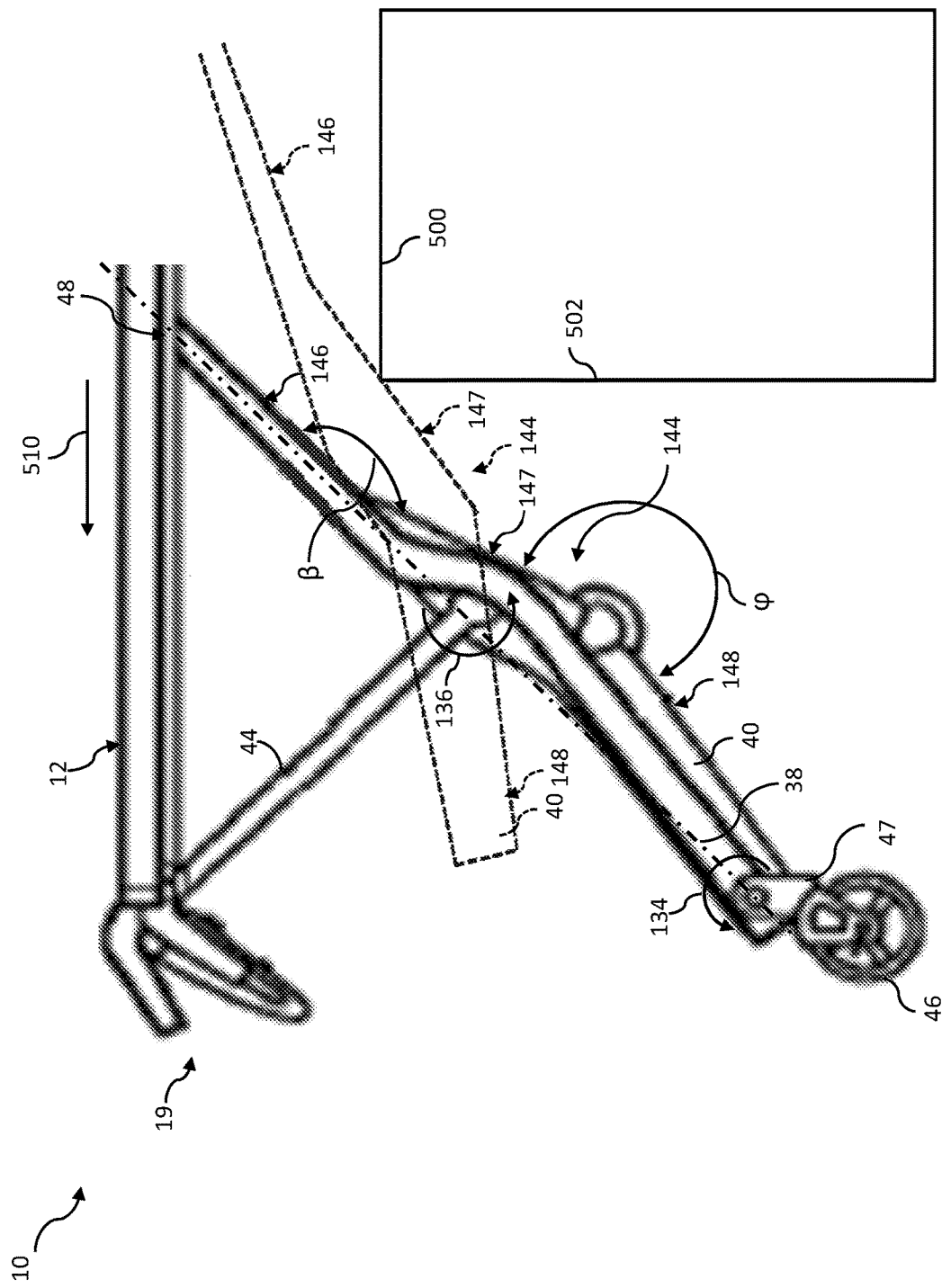
FIG. 12 schematically depicts the back legs of FIG. 6A in isolation according to one or more embodiments described herein.

Referring now to FIG. 12, the back leg 40 can comprise a sinuous internal edge 144 configured to assist with unloading the roll-in cot 10. The sinuous internal edge 144 can be formed along the portion of the back leg 40 that is facing the front end 17 of the roll-in cot 10. In some embodiments, the sinuous internal edge 144 can be formed from one or more facets, one or more polynomial shaped contours, or combinations thereof. For example, the sinuous internal edge 144 can comprise a first edge segment 146, a second edge segment 147, and a third edge segment 148. As used herein, the phrase "edge segment" can mean a partition of an edge. Thus an edge segment can be a partition of a substantially curved line, a substantially straight line, or combinations thereof. The first edge segment 146 can be located towards the top of the sinuous internal edge 144, i.e., towards the intersection of the back leg 40 and the support frame 12. The third edge segment 148 can be located towards the bottom of the sinuous internal edge 144, i.e., towards the back wheel 46. The second edge segment 147 can be located between the first edge segment 146 and the third edge segment 148.

In some embodiments, the sinuous internal edge 144 of the back leg 40 can comprise an upper angle β formed between the first edge segment 146 and the second edge segment 147. The upper angle β can be configured such that extension of the back leg 40 imparts an unloading force 510 upon the roll-in cot 10. Specifically, as the back leg 40 extends, the sinuous internal edge 144 of the back leg 40 can contact (depicted in FIG. 12 as a dashed line object) the loading surface 500, the loading edge 502, or both. When such contact is made, extension of the back leg 40 can generate the unloading force 510 and urge the roll-in cot 10 along the direction of the unloading force 510. In some embodiments, the upper angle β can be formed to enhance contact between the second edge segment 147 of the sinuous internal edge 144 and the loading surface 500, the loading edge 502, or both. Specifically, the upper angle β can be substantially obtuse such as, for example, between about 140° (about 2.44 radians) and about 175° (about 3.05 radians) in one embodiment, or between about 155° (about 2.71 radians) and about 175° (about 3.05 radians) in another embodiment, or between about 160° (about 2.79 radians) and about 170° (about 2.97 radians) in a further embodiment.

Alternatively or additionally, the sinuous internal edge 144 of the back leg 40 can comprise a lower angle φ formed between the second edge segment 147 and the third edge segment 148. The lower angle φ can be configured to provide clearance between the back leg 40 and the loading edge 502, when the back leg 40 is fully extended. The lower angle φ can be a reflex angle such as, for example, between about 185° (about 3.23 radians) and about 240° (about 4.19 radians) in one embodiment, or between about 195° (about 3.40 radians) and about 230° (about 4.01 radians) in another embodiment, or between about 205° (about 3.58 radians) and about 220° (about 3.84 radians) in a further embodiment.

In embodiments where the sinuous internal edge 144 comprises both the upper angle β and the lower angle φ, the upper angle β and the lower angle φ can be defined in combination such that the intersection between the back hinge member 44 and the back leg 40 is disposed substantially in line with the back leg span 38. In some embodiments, the upper angle β can be located above the axis of rotation 136 of the back hinge member 44. For example, the upper angle β can be closer to the support frame 12 than the axis of rotation 136 of the back hinge member 44 as measured along the back leg span 38. Alternatively or additionally, and the lower angle φ can be located below the axis of rotation 136 of the back hinge member 44. For example, the lower angle φ can be further from the support frame 12 than the axis of rotation 136 of the back hinge member 44 as measured along the back leg span 38. Accordingly, the upper angle β of the sinuous internal edge 144 can be located above the lower angle φ of the sinuous internal edge 144.

It should now be understood that the embodiments described herein may be utilized to transport patients of various sizes by coupling a support surface such as a patient support surface to the support frame. For example, a lift-off stretcher or an incubator may be removably coupled to the support frame. Therefore, the embodiments described herein may be utilized to load and transport patients ranging from infants to bariatric patients. Furthermore the embodiments described herein, may be loaded onto and/or unloaded from an ambulance by an operator holding a single button to actuate the independently articulating legs (e.g., pressing the "−" on the toggle switch to load the cot onto an ambulance or pressing the "+" on the toggle switch to unload the cot from an ambulance). Specifically, the roll-in cot 10 may receive an input signal such as from the operator controls. The input signal may be indicative of a first direction or a second direction (i.e., lower or raise). The pair of front legs and the pair of back legs may be lowered independently when the signal is indicative of the first direction or may be raised independently when the signal is indicative of the second direction.

It is further noted that terms like "preferably," "generally," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having provided reference to specific embodiments, it will be apparent that modifications and variations are possible without departing from the scope of the present disclosure defined in the appended claims. More specifically, although some aspects of the present disclosure are identified herein as preferred or particularly advantageous, it is contemplated that the present disclosure is not necessarily limited to these preferred aspects of any specific embodiment.

What is claimed is:

1. A roll-in cot configured to lessen a need for an operator to support the roll-in cot for at least a portion of a process of loading the roll-in cot onto or unloading the roll-in cot from a loading surface, the roll-in cot comprising:
   a support frame comprising a back end and a front end, the front end comprising at least one front load wheel coupled thereto;
   a front carriage member and a back carriage member each slidingly coupled to the support frame;
   a pair of back legs pivotably coupled to the back carriage member such that the pair of back legs moves both translationally and rotationally relative to the support frame, wherein each of the pair of back legs comprises a back wheel and corresponding linkage disposed at a back leg distal end;
   a pair of front legs pivotably coupled to the front carriage member such that the pair of front legs moves both translationally and rotationally relative to the support frame, wherein each of the pair of front legs comprises a front wheel and corresponding linkage disposed at a front leg distal end and an intermediate load wheel disposed along a length between the front leg distal end and a front leg proximal end;
   a pair of front hinge members pivotably coupled at one end to the support frame and at an opposing end to the pair of front legs at a point intermediate the front leg proximal end and the front leg distal end;
   a pair of back hinge members pivotably coupled at one end to the support frame and at an opposing end to the pair of back legs at a point intermediate the back leg proximal end and the back leg distal end; and
   a cot actuation system, comprising a front actuator and a back actuator, in cooperation with the pair of back legs, the pair of front legs, the pair of back hinge members and the pair of front hinge members to raise and lower the support frame through selective independent movement of the pair of back legs and the pair of front legs relative to one another such that the at least one front load wheel and the intermediate load wheels provide a weight support of the roll-in cot when a center of gravity of the roll-in cot is above the loading surface.

2. The roll-in cot of claim 1, wherein the intermediate load wheels act as a fulcrum when the center of gravity of the roll-in cot is above the loading surface.

3. The roll-in cot of claim 2, wherein when the intermediate load wheels act as the fulcrum, the intermediate load wheels are offset from the pair of back legs along a loading direction of the roll-in cot by a loading span.

4. The roll-in cot of claim 2, wherein a plurality of respective spans and angles comprises:
   a back leg span that extends from (a) a point on the back carriage member where each of the pair of back legs are pivotably connected, to (b) the back wheel linkage;
   a loading angle formed between each of the pair of back legs and a substantially horizontal projection from a plane that is defined by the loading surface;
   a front leg span that extends from (a) a point on the front carriage member where each of the pair of front legs are pivotably connected, to (b) a front wheel linkage;
   an intermediate span that extends from a point that coincides with an axis of rotation of the intermediate load wheels to a point on the back carriage member where each of the pair of back legs are pivotably connected;
   a back leg angle formed between the back leg span and the intermediate span when the center of gravity of the roll-in cot is above the loading surface;
   an upper angle formed between a first pair of adjacent segments of a sinuous internal edge that is defined on of each of the plurality of back legs such that the sinuous internal edge faces the front end of the support frame;
   a lower angle formed between a second pair of adjacent segments of the sinuous internal edge; and
   a loading span that extends substantially horizontally from (a) the point that coincides with an axis of rotation of the intermediate load wheels to (b) a forwardmost location on a respective one of the pair of back legs that is on a substantially horizontal projection from the plane that is defined by the loading surface.

5. The roll-in cot of claim 4, wherein the back leg angle is an acute angle.

6. The roll-in cot of claim 4, wherein a load wheel distance is greater than the loading span.

7. The roll-in cot of claim 6, wherein the loading span is between about 50% and about 95% of the load wheel distance.

8. The roll-in cot of claim 6, wherein the loading span is between about 4 inches and about 24 inches.

9. The roll-in cot of claim 4, wherein the upper angle is substantially obtuse.

10. The roll-in cot of claim 4, wherein the lower angle is a reflex angle.

11. The roll-in cot of claim 4, wherein the upper angle and the lower angle cooperate such that an intersection between the back hinge member and a respective one of the back legs is disposed substantially in line with the back leg span.

12. The roll-in cot of claim 4, wherein the upper angle is located above the axis of rotation of the back hinge member such that the upper angle is closer to the support frame than the axis of rotation of the back hinge member as measured along the back leg span.

13. The roll-in cot of claim 4, wherein the lower angle is located below the axis of rotation of the back hinge member such that the lower angle is farther from the support frame than the axis of rotation of the back hinge member as measured along the back leg span.

14. The roll-in cot of claim 1, wherein the pair of front hinge members define a front hinge member distance along a length dimension of the pair of front legs.

15. The roll-in cot of claim 1, further comprising:
   a plurality of sensors; and
   a control box cooperative with the plurality of sensors and the cot actuation system.

16. The roll-in cot of claim 15, wherein the plurality of sensors comprise a sensor which registers when the roll-in cot is fully disposed in an emergency vehicle, the sensor configured to send a signal to the cot actuation system which results in locking an actuator.

17. The roll-in cot according to claim 15, where the control box controls a visual display that is configured to inform the operator whether the cot actuation system is activated or deactivated.

18. The roll-in cot of claim 1, further comprising a hook engagement bar that is operable to engage with a loading surface hook on the loading surface to prevent the roll-in cot from sliding backwards from the loading surface.

19. The roll-in cot of claim 18, wherein the hook engagement bar comprises a sensor which detects the engagement of the hook engagement bar and the loading surface hook.

20. The roll-in cot of claim 19, wherein the sensor which detects the engagement of the hook engagement bar is selected from the group consisting of a touch sensor and a proximity sensor.

\* \* \* \* \*